(12) United States Patent
Ramirez et al.

(10) Patent No.: US 6,504,575 B1
(45) Date of Patent: Jan. 7, 2003

(54) METHOD AND SYSTEM FOR DISPLAYING OVERLAY BARS IN A DIGITAL IMAGING DEVICE

(75) Inventors: Michael A. Ramirez, Palo Alto, CA (US); Eric C. Anderson, San Jose, CA (US)

(73) Assignee: FlashPoint Technology, Inc., Peterborough, NH (US)

( * ) Notice: Subject to any disclaimer, the term of this patent is extended or adjusted under 35 U.S.C. 154(b) by 0 days.

(21) Appl. No.: 09/032,177

(22) Filed: Feb. 27, 1998

(51) Int. Cl.[7] .............................................. H04N 5/222
(52) U.S. Cl. ............................ 348/333.02; 348/333.11
(58) Field of Search .................................. 348/207, 222, 348/239, 333.01, 333.02, 333.05, 333.11, 333.12, 333.04; 345/629; H04N 5/222

(56) References Cited

U.S. PATENT DOCUMENTS 5,949,432 A * 9/1999 Gough et al. ............... 345/435
6,144,362 A * 11/2000 Kawai ......................... 345/115
6,310,648 B1 * 10/2001 Miller et al. ............ 348/333.05

* cited by examiner

Primary Examiner—Tuan Ho
(74) Attorney, Agent, or Firm—Sawyer Law Group LLP

(57) ABSTRACT

A method and system for displaying an overlay bar on a digital imaging device is disclosed. First, text and graphic information to be displayed on the overlay bar are stored in an overlay bar buffer, and then displayed on a display screen. Thereafter, an image to be viewed is displayed on the display line-by-line. The lines of the image that are to be displayed within the area of an overlay bar are stored in a backstore buffer. Each line in the backstore buffer is then merged with its corresponding lines in the overlay bar buffer and displayed. The merging operation is performed by modifying the luminance value of each pixel of the image data that falls within the area of the overlay bar, and overwriting each pixel of image data that falls under a pixel of text in the overlay bar. This makes the overlay bar appear to the user to be translucent and makes the image appear as though it is sliding beneath the overlay bar as it is being displayed. When the user turns-off the overlay bars, only the portions of the image stored in the backstore buffer need be re-displayed to provide the original image, thus eliminating the need to re-display the entire image.

7 Claims, 11 Drawing Sheets

METHOD AND SYSTEM FOR DISPLAYING OVERLAY BARS IN A DIGITAL IMAGING DEVICE

CROSS-REFERENCE TO RELATED APPLICATIONS

This application is related to U.S. patent application Ser. No. 09/082172 entitled "Method And System For Controlling User Interaction In A Digital Imaging Device Using Dynamic Overlay Bars" (P135), and U.S. patent application Ser. No. 09/032659 entitled "Directing Image Capture Sequences In A Digital Imaging Device Using Scripts" (P165), which were filed on the same date as the present application.

FIELD OF THE INVENTION

The present invention relates generally to digital imaging devices, including digital cameras, and more particularly to a method and system for displaying overlay bars in a digital imaging device.

BACKGROUND OF THE INVENTION

Most digital cameras today are similar in size to and behave like conventional point-and-shoot cameras. Unlike conventional cameras, however, most digital cameras store digital images in an internal flash memory or on external memory cards, and some are equipped with a liquid-crystal display (LCD) screen on the back of the camera. Through the use of the LCD, most digital cameras operate in two modes, record and play, although some only have a record mode.

In record mode, which is also referred to as capture mode, the LCD acts as a live viewfinder in which the user may view an object or scene before taking a picture, similar to the LCD on a camcorder. When the user presses the shutter button, whatever scene is shown on the LCD is captured as a still image. Besides capturing still images, some digital cameras can be set to capture other image types, such as burst and time-lapse images. A burst image is a series of still images captured in rapid succession, while a time-lapse image is series of still images taken at regular intervals over a longer time period.

In play mode, the LCD acts as a playback screen for reviewing the previously captured images. Typically, several small images are displayed on the LCD at once, and by selecting one of the images the user may then display the full-sized version of the images in the LCD.

Although conventional digital cameras are more convenient for the user to use than film cameras due to instant play back of captured images, there are several drawbacks in the user interface that restrict user interaction with the camera. When capturing images, for example, it is often helpful for the user to be informed about the current settings or operational state of the camera, such as whether the flash is on/off, and the current image type setting, for instance.

In conventional digital cameras, such status information is typically displayed as text blocks or accessed through a status screen or the like. The disadvantage with the text blocks is that they are typically small (10–15 characters in length), and therefore, the amount of status information they can provide is very limited. Typically, text blocks are used to display information such as the current image number. Moreover, when text blocks are displayed with a solid color background, the background obscures that portion of the image. And when text blocks are displayed with no background (only text), the text is difficult to distinguish from the colors comprising the image, making the text hard to read.

The disadvantage with status screens is that in order to view the status information, the image currently displayed on the LCD must be replaced with the status screen, causing the user to loose sight of the image. Another approach would be to shrink the display area of the LCD and add a black status area in the viewfinder, as done in optical viewfinders of film cameras. This, however, would shrink the size of images displayed in the viewfinder.

Another drawback with conventional digital cameras is that as technological advances are made, digital cameras are continually provided with more features and functions, which make them more complex for the user to interact with. This is similar to what occurs with PC software, which increasingly grows larger and harder to use. PC developers attempt to alleviate this problem by providing more and larger help menus. Each help menu usually opens in its own window with paragraphs of scrolling text.

Using PC help menus in a digital camera to guide user interaction through the camera features and functions would be less than ideal because of the limited size of the camera LCD. And assuming help menus were displayed, they would either obscure whatever image was being displayed or otherwise total replace it, which is disadvantageous to the picture taker.

Accordingly, what is needed is an improved system and method for displaying status information in a manner that does not obscure the display of the current object in the LCD, and for controlling user interaction in a digital imaging device. The present invention addresses such a need.

SUMMARY OF THE INVENTION

The present invention provides a method and system for controlling user interaction in a digital imaging device having a display using dynamic overlay bars. The digital imaging device includes at least two operating modes, where each of the operating modes has at least one mode-specific operation that can be performed on images. In response to operating in either of the operating modes, the digital imaging device displays a translucent overlay bar on the display that is dynamically updated with status information and interactive instructions that guide the user through the mode-specific operations.

In a second aspect of the present invention, the interactive instructions are implemented using a script, which is a text-based program that may be easily written by the user and externally loaded into the camera. Once loaded into the camera, the commands comprising the script are translated and executed one-by-one by a script interpreter to guide the user through the newly provided function.

A third aspect of the present invention, provides a method and system for displaying overlay bars on the display. First, text and graphic information to be displayed on the overlay bars are stored in an overlay bar buffer, and then displayed on the display. Thereafter, the current image is displayed on the display line-by-line. The lines of the image that will be displayed within the area of an overlay bar are stored in a backstore buffer. Each line in the backstore buffer is merged with its corresponding lines in the overlay bar buffer and displayed. This aspect of the present invention makes the overlay bars appear translucent, and the image appear as though it is sliding beneath the overlay bars as it is being displayed. When the user turns-off the overlay bars, only the portions of the image stored in the backstore buffer need be re-displayed to provide the original image, thus eliminating the need to re-display the entire image.

Accordingly, the method and system of the present invention provides status information to a user and allows the user to perform complex camera functions and features to the images with minimum effort, while allowing for easy viewing of the images. Displaying interactive instructions on dynamic overlay bars to guide the user through complex tasks in accordance with the present invention eliminates the need for help screens and for the user to remember complicated key sequences, and increases the ease of use and operation of the digital camera. The manner in which the overlay bars and the image is displayed makes the user interface more aesthetically pleasing, while increasing the display speed of the digital imaging device.

DETAILED DESCRIPTION OF THE INVENTION

The present invention relates to an improved method and system for displaying overlay bars in a digital imaging device. The following description is presented to enable one of ordinary skill in the art to make and use the invention and is provided in the context of a patent application and its requirements. Although the present invention will be described in the context of a digital camera, various modifications to the preferred embodiment will be readily apparent to those skilled in the art and the generic principles herein may be applied to other embodiments. That is, any digital imaging device which displays images, icons and/or other items, could incorporate the features described herein below and that device would be within the spirit and scope of the present invention. Thus, the present invention is not intended to be limited to the embodiment shown but is to be accorded the widest scope consistent with the principles and features described herein.

The present invention is a method and system for displaying dynamic overlay bars in a digital imaging device. According to the present invention, both status information and interactive instructions are displayed on dynamic overlay bars to enable a user to perform complex camera functions and apply features to the images with minimum effort, while allowing for easy viewing of the images.

Figure 1:
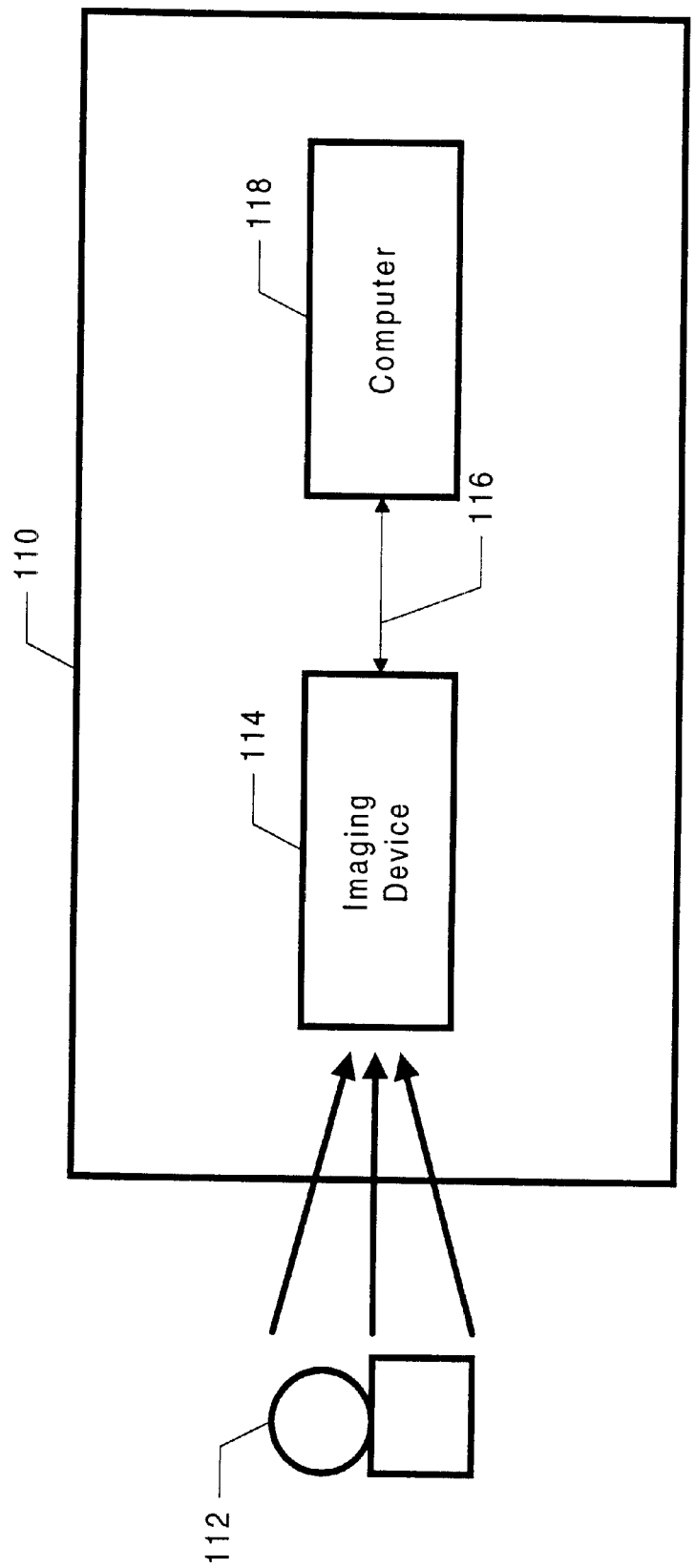
FIG. 1 is a block diagram of a digital camera that operates in accordance with the present invention.

Referring now to FIG. 1, a block diagram of a digital camera 110 is shown for use in accordance with the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
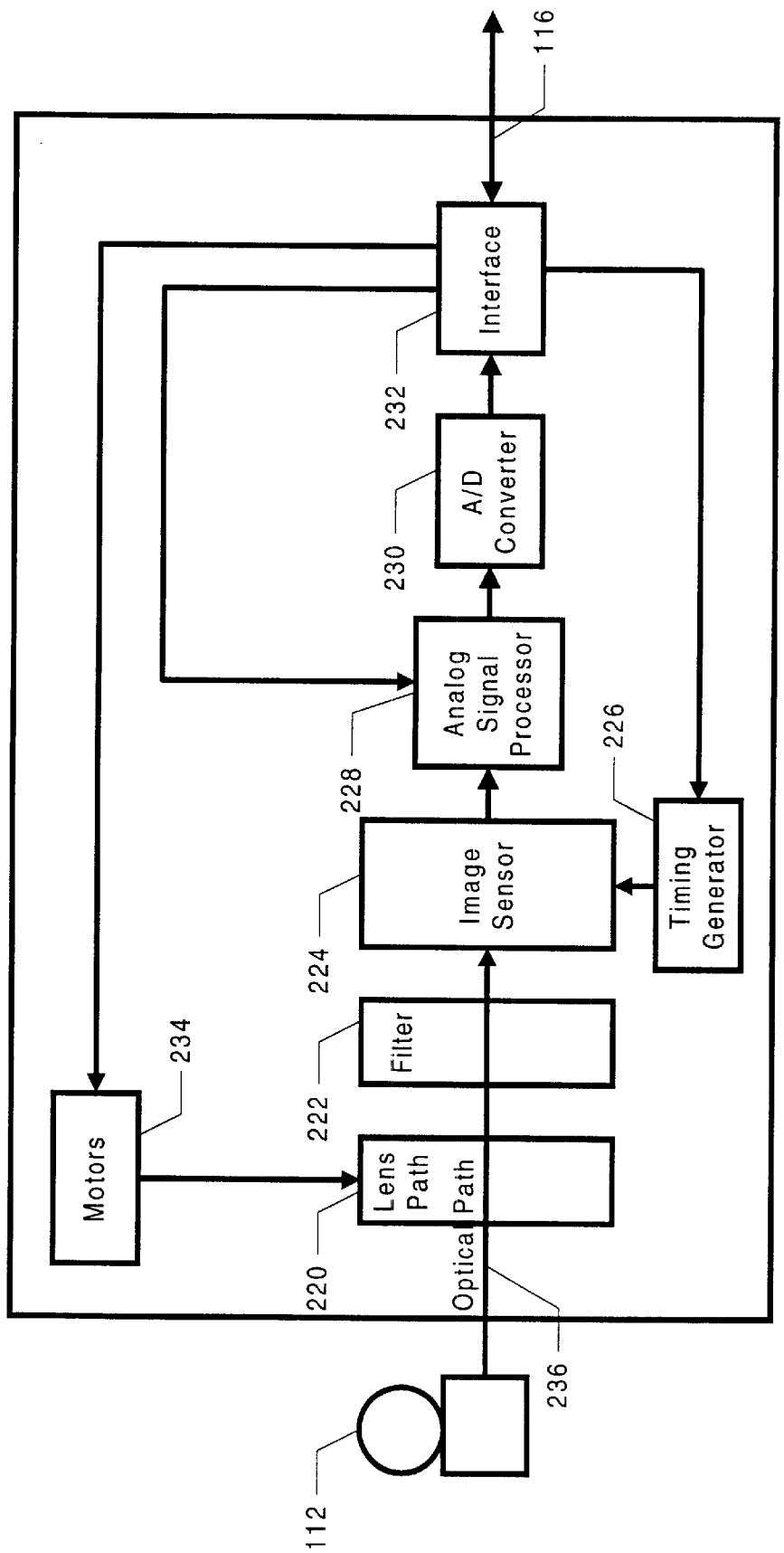
FIG. 2 is a block diagram of an example embodiment for the imaging device of FIG. 1.

Referring now to FIG. 2, a block diagram of an example embodiment of imaging device 114 is shown. Imaging device 114 typically comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224, which is typically a charged coupled device (CCD), responsively generates a set of raw image data in CCD format representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
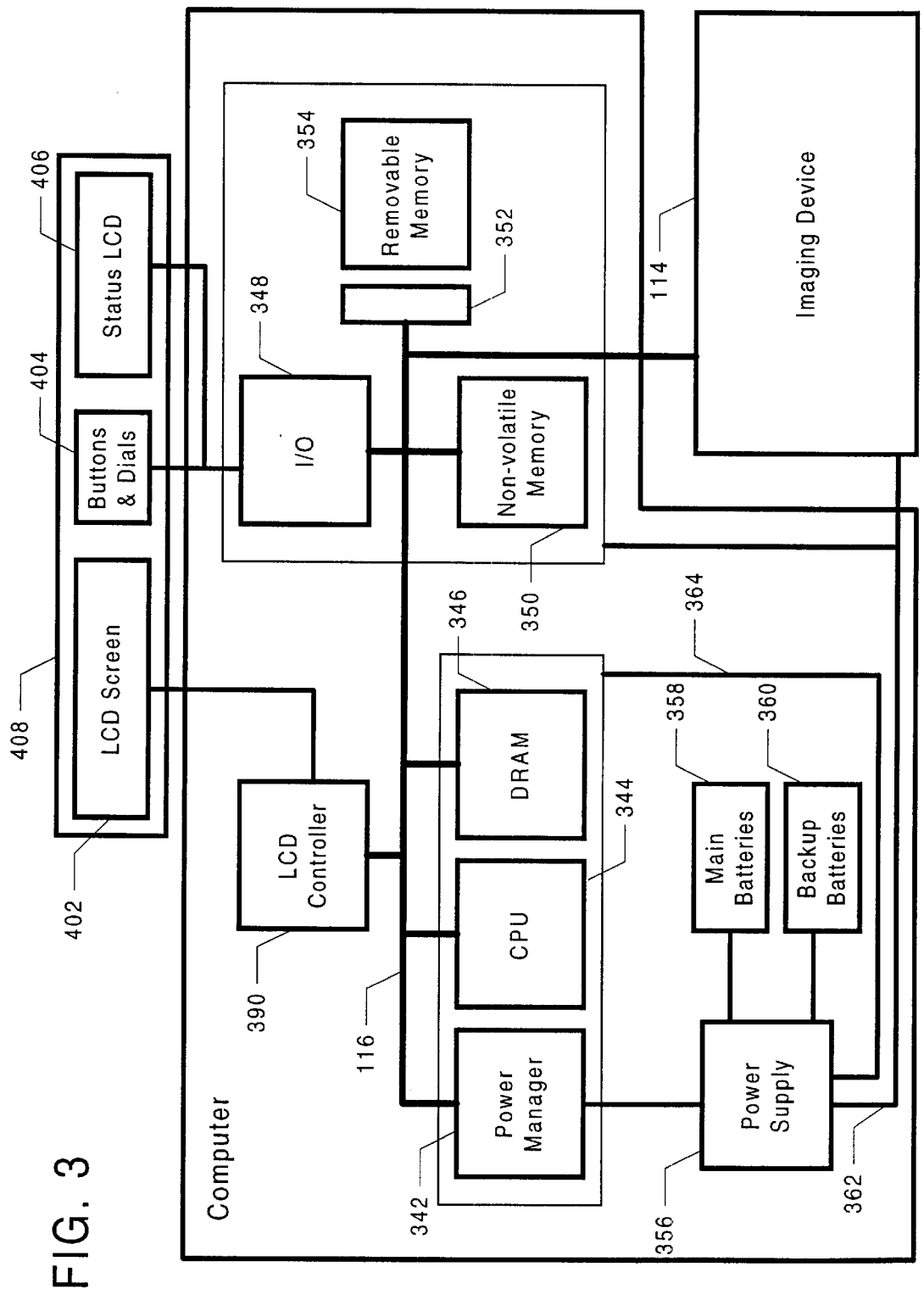
FIG. 3 is a block diagram of an example embodiment for the computer of FIG. 1.

Referring now to FIG. 3, a block diagram of an example embodiment for computer 118 is shown. System bus 116 provides connection paths between imaging device 114, an optional power manager 342, central processing unit (CPU) 344, dynamic random-access memory (DRAM) 346, input/output interface (I/O) 348, non-volatile memory 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multithreaded environment. DRAM 346 is a contiguous block of dynamic memory which may be selectively allocated to various storage functions. LCD controller 390 accesses DRAM 346 and transfers processed image data to LCD screen 402 for display.

I/O 348 is an interface device allowing communications to and from computer 118. For example, I/O 348 permits an external host computer (not shown) to connect to and communicate with computer 118. I/O 348 also interfaces with a plurality of buttons and/or dials 404, and an optional status LCD 406, which in addition to the LCD screen 402, are the hardware elements of the camera's user interface 408.

Non-volatile memory 350, which may typically comprise a conventional read-only memory or flash memory, stores a set of computer-readable program instructions to control the operation of camera 110. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, non-volatile memory 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364. During a power failure mode in which the main batteries 358 have failed (when their output voltage has fallen below a minimum operational voltage level) the backup batteries 360 provide operating power to power supply 356 which then provides the operating power only to the secondary power bus 364 of camera 110.

Figure 4:
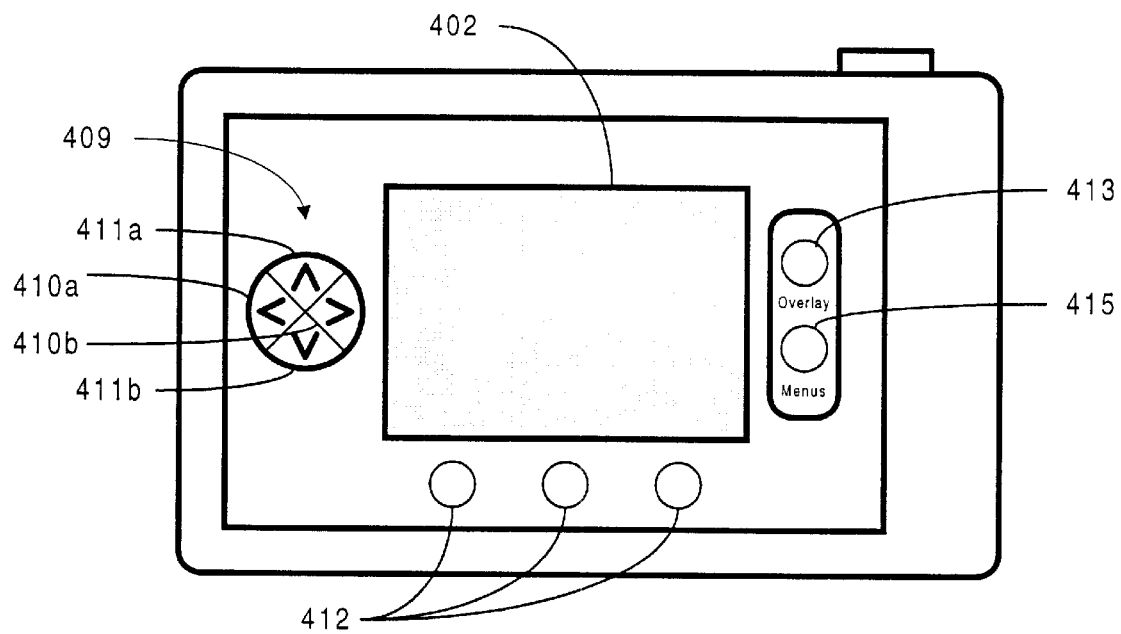
FIGS. 4 and 5 are diagrams depicting the preferred embodiment of the camera's 110 user interface.
Figure 5:
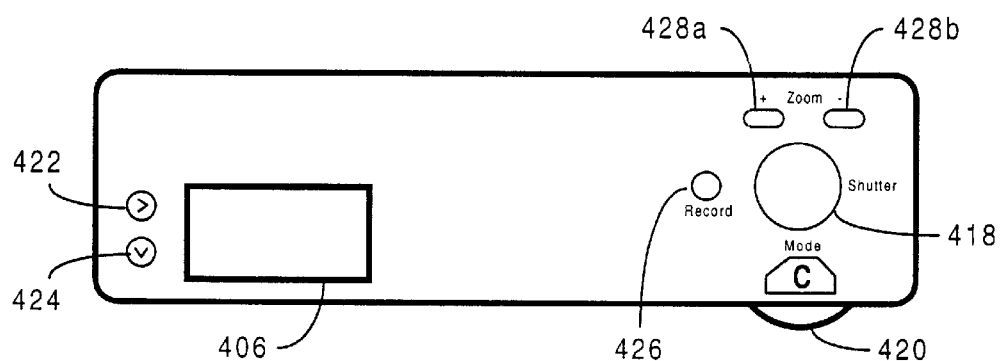

FIGS. 4 and 5 are diagrams depicting the preferred hardware components of the camera's 110 user interface 408. FIG. 4 is back view of the camera 110 showing the LCD screen 402, a four-way navigation control button 409, an overlay button 413, a menu button 414, and a set of programmable soft keys 416. FIG. 5 is a top view of the camera 110 showing a shutter button 418, and a mode dial 420. The camera may optionally include status LCD 406, status LCD scroll and select buttons 422 and 424, a sound record button 426, and zoom-in, zoom-out buttons 428*a* and 428*b*.

The digital camera of the present invention is controlled by graphical-user-interface (GUI) based operating system (OS), which is in contrast to conventional digital cameras that are controlled by proprietary hardware architectures. In the preferred embodiment of the present invention, the OS provides the digital camera with several different operating modes for supporting various camera functions. Although the digital camera may include several different operating modes, the modes relevant to this description are capture mode, and play mode.

In capture mode, the camera 100 supports the actions of preparing to capture an image, and capturing an image through the use of either the LCD screen 402 or the status LCD 406. In play mode, the camera 110 supports the actions of displaying full-sized views of captured images, and play-backing various media types associated with the images, such as sound. The user may switch between the various modes, using the mode dial 420. When the camera is placed into a particular mode, that mode's default screen appears in the LCD screen 402 in which a set of mode-specific items, such as images, icons, and text, are displayed.

The present invention provides a method and system for controlling user interaction in a digital imaging device using dynamic overlay bars. According to the present invention, the dynamic overlay bars are used to provide the user with both status information and interactive instructions. The interactive instructions are automatically updated in response to normal camera operations to guide the user through predefined operations of the camera, thus making the device extremely easy to use. In addition, the manner in which the dynamic overlay bars are displayed reduces viewing interference with the currently displayed object.

Figure 6:
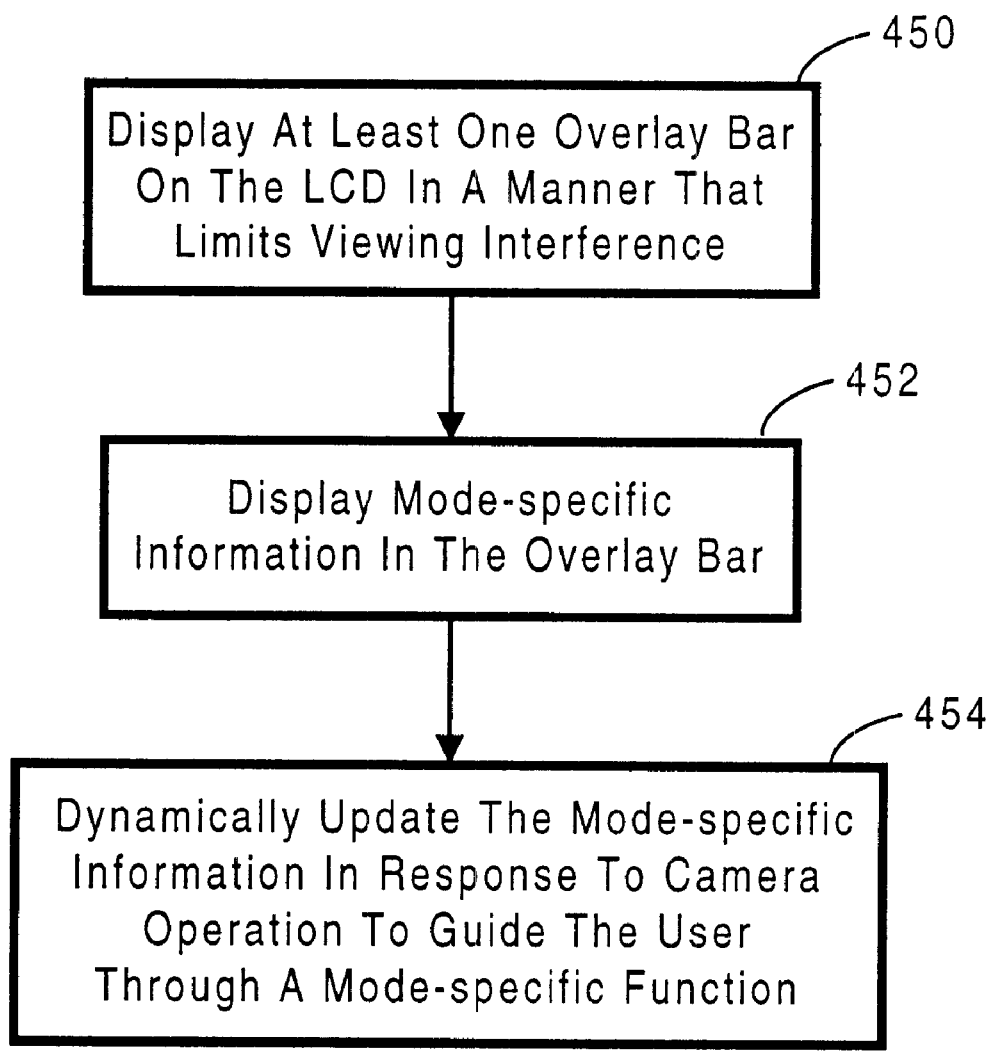
FIG. 6 is a flow chart is shown illustrating the process of controlling user interaction in a digital imaging device using dynamic overlay bars in accordance with the present invention.

Referring now to FIG. 6, a flow chart is shown illustrating the process of controlling user interaction in a digital imaging device using dynamic overlay bars in accordance with the present invention. The process begins by displaying an image on the LCD screen 402 along with at least one overlay bar that provides a dynamic prompt area in a way that minimizes viewing interference with the displayed image in step 450.

In a preferred embodiment, viewing interference is minimized by positioning the overlay bar along an edge of the LCD screen 402 and by displaying the background of the bar translucently so that the user may see the image through the overlay bar. The overlay bar may also be displayed with a solid color background, but this is less desirable since the bar would overwrite that portion of the image.

In response to the camera being placed into one of the operating modes, the overlay bar displays mode-specific information for the user in step 452. In a preferred embodiment, the mode-specific information displayed on the overlay bar includes a combination of static status information, dynamically updated soft key labels, and interactive instructions pertaining to the particular mode, as described further below. After the mode-specific information is displayed, the mode-specific information is then dynamically updated during the operation of the camera to guide the user through a mode-specific function in step 454.

Figure 7A:
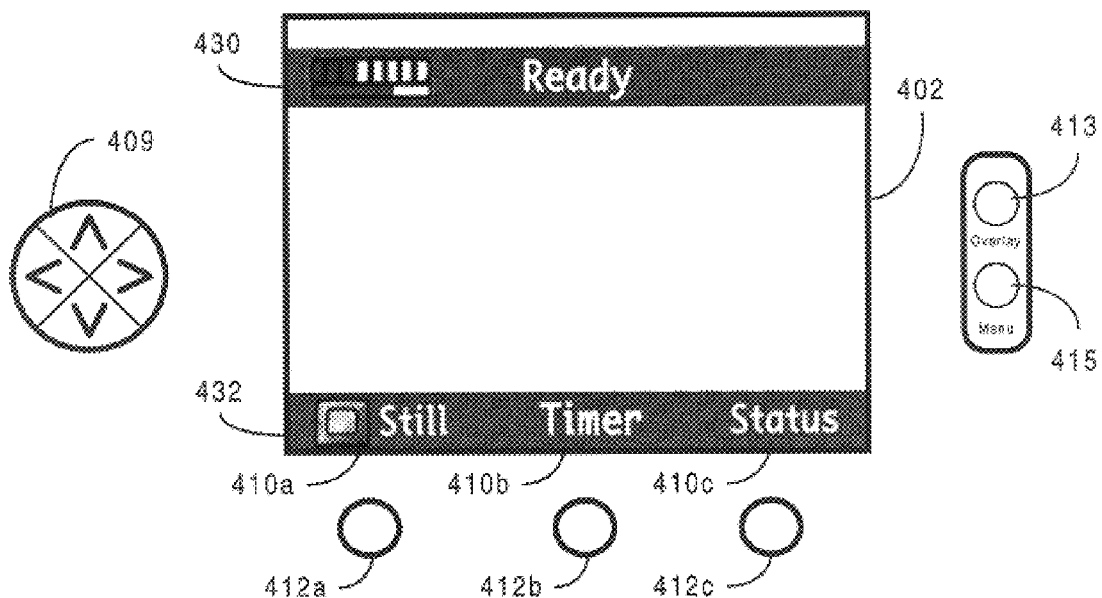
FIGS. 7A and 7B are diagrams illustrating the use of dynamic overlay bars on the LCD screen during capture and play modes, respectively.
Figure 7B:
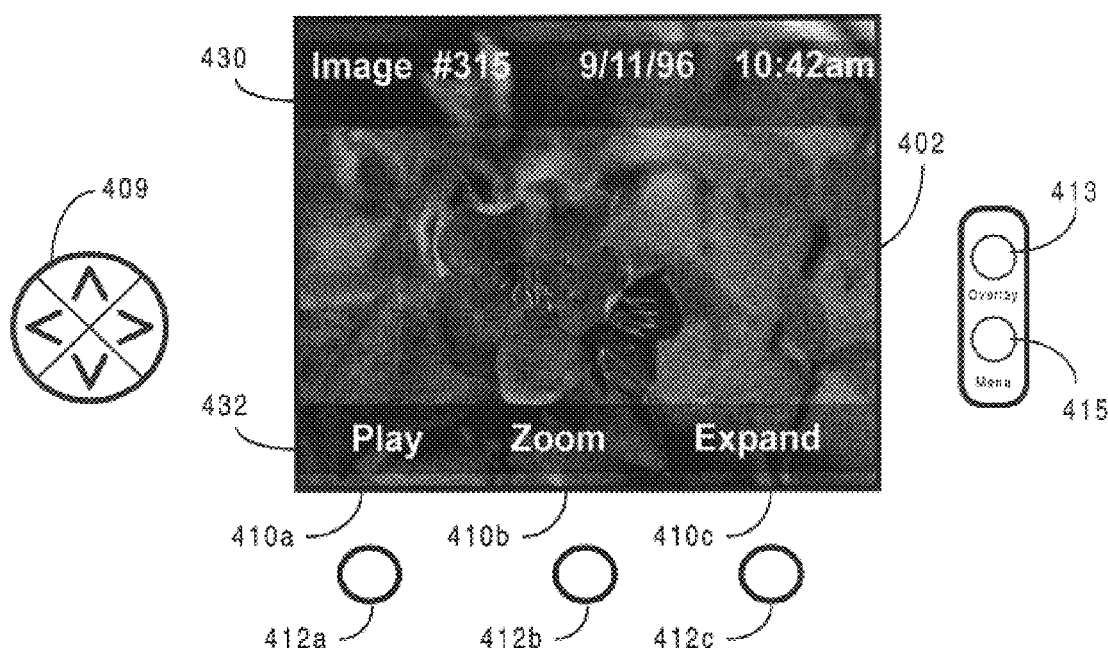

To more particularly describe the present invention, refer to FIGS. 7A and 7B illustrating the use of dynamic overlay bars on the LCD screen 402 during two different operating modes of the digital camera 110. As shown, in a preferred embodiment of the present invention, two overlay bars 430 and 432 are simultaneously displayed on the LCD screen 402, rather than one, to strike a balance between the amount of information provided to the user and the amount of screen area consumed by text and/or graphics.

Overlay bar 430 may be used primarily to display status information and interactive instructions, while overlay bar 432 may be used primarily to display soft key labels 410 corresponding to soft keys 412. Both overlay bars 430 and 432 may be turned-off in each of the camera operating modes by pressing the overlay "on/off" button 413 so that users can have an unobstructed view of images it they so choose (off), or extra help in operating the camera (on).

Referring to FIG. 7A, the display of the overlay bars 430 and 432 on the LCD screen 402 during capture mode is shown. In capture mode, the camera 110 supports the actions of preparing to capture an image, and capturing an image through the use of either the LCD screen 402 alone or with the aid of an optional optical viewfinder (not shown).

Overlay bar 430 is updated with capture status information during capture mode, which may include a graphic memory gauge, and text indicating the state of the camera (Ready), for example. The memory gauge provides the user with a constant overview of camera memory usage in terms of disk space, and may also show working memory usage. In a preferred embodiment, the memory bar displays disk space usage as segments filling-up, and displays working memory usage as the bar below those segments, which is constantly updated to reflect current memory status. When the working memory buffers are empty, the bottom part of the bar would be clear. When there is the equivalent of storage for only a few pictures left, the storage gauge may flash and the overlay bar 430 may be updated with a message, such as "Storage Almost Full". If a user tries to take a picture without adequate storage, then the overlay bar 430 may be updated to reflect this status by displaying the message "Inadequate Storage," along with an optional sound from the camera.

The overlay bar 430 may also be updated to reflect other types of capture status information and may be expanded into additional lines if needed. The additional capture status information could include the following: 1) Low Battery Indication—when main batteries run low, a battery icon may replace the storage gauge and a overlay bar 430 may be updated to flash "Battery Low"; 2) Shake Warning Indication—when light level is too low for recommended hand held operation and user has disabled the strobe system "Shake Warning" may be displayed in the overlay bar 430; and 3) No Focus Indication—when the focus system cannot adequately focus the camera lens, a "No Focus" may be displayed in the overlay bar 430.

Referring now to FIG. 7B, the display of the overlay bars 430 and 432 on the LCD screen 402 during play mode is shown. In a preferred embodiment, the play screen layout displays one full-sized image at a time and the user may chronologically scroll through the full-sized images in the LCD screen 402 using the left/right buttons on four-way navigation control button 409. Users can also play back various media types, such as time-lapse, bursts and slide show images according to either default or user defined play back rates.

In the play mode, overlay bar 430 displays status information relating to the current image being displayed, such as the image name/number, and the date and time of capture. The status information may also include graphical icons indicating what category of images the image belongs to and the image type.

Referring to both FIGS. 7A and 7B, besides displaying status information, the second use of the dynamic overly bars of the present invention is to display soft key labels 410 for soft keys 412. As described in U.S. patent application Ser. No. 08/939,993 filed on Sept. 26, 1997, entitled "A Method And System For Manipulating Images Stored In A Digital Imaging Device," assigned to the present assignee and hereby incorporated by reference, soft keys 412a, 412b, and 412c of the user interface 400 are programmable, i.e., they may be assigned predefined functions. The function currently assigned to a respective soft key 412 is indicated by the soft key labels 410a, 410b, and 410c displayed in overlay bar 432. After a soft key label 410 has been displayed, the user may then press the corresponding soft key 412 to have the function indicated by its label applied to the current image.

Referring to FIG. 7B for example, the function assigned to the soft key 412b in during play mode is a "Zoom" function, which allows a user to zoom in and out of a displayed image. When the user zooms-in on an image by pressing the soft key 412b, the "Zoom" soft key label 410b is changed to "Zoom-out". While an image is zoomed, the user may pan around the image using the four-way control button 406.

The functions assigned to the soft keys 412, and thus the soft key labels 410, are changed in response to several different factors. The soft keys 412 may change automatically either in response to user actions, or based on predetermined conditions existing in the camera, such as the current operating mode, the image type, and so on. The soft keys 412 may also be changed manually by the user by pressing the menu button 415. Providing programmable soft keys 412 increases the number of functions that may be performed by the camera, while both minimizing the number of buttons required on the user interface, and reducing the need to access hierarchical menus.

As stated above, in addition to displaying status information and soft key labels, the dynamic overlay bars of the present invention may also be used to display interactive instructions to the user to guide user through camera functions. Basic types of camera functions include reviewing captured images, deleting images, annotating images with sound, and capturing groups of related images. With conventional cameras, the user would have to memorize complicated key sequences in order to perform these functions.

The present invention, in contrast, uses the dynamic overlay bars to display interactive instructions that guide the user through operations such as adding sound to an image, deleting images and/or sound, and capturing groups of related images. As described in U.S. patent application Ser. No. 08/939,993, for example, after the user has captured an image and the image is displayed for review, the overlay bar 432 automatically reminds the user that he or she has the option to delete the image. That is, one of the soft key labels 410 is changed to "Delete" and the user may then delete image by pressing the corresponding "Delete" soft key 412.

Figure 8A:
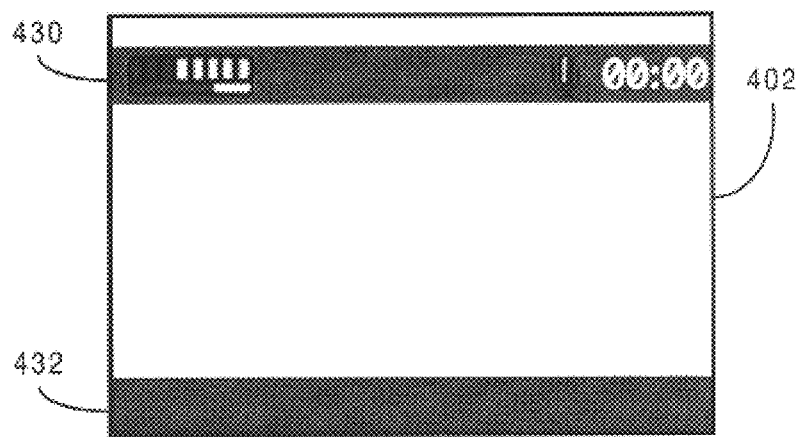
FIGS. 8A through 8C are diagrams illustrating how the overlay bars may be used to guide the user through a recording of a sound annotation.
Figure 8B:
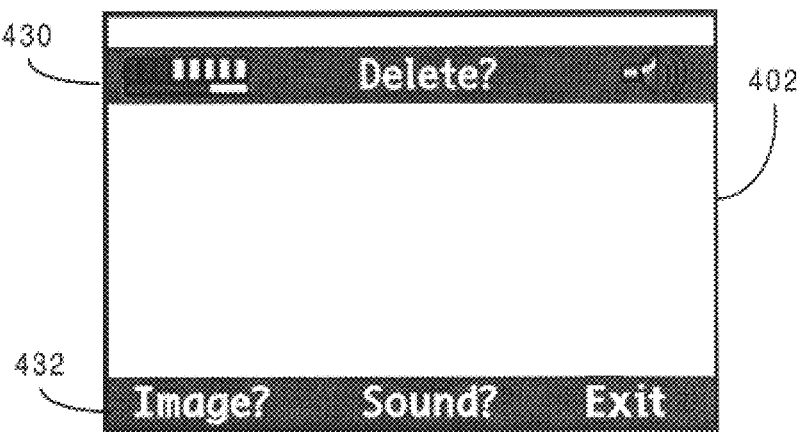
Figure 8C:

Referring now to FIGS. 8A through 8C, diagrams illustrating how the overlay bars may be used to guide the user through a recording of a sound annotation are shown. The user may initiate the sound annotation function by pressing the record button 426 (see FIG. 5) while an image is displayed. In response, a record indication, such as a microphone icon, is automatically displayed in overlay bar 430 along with a display of the duration of the recording, as shown in FIG. 8A. After the sound annotation is recorded, the soft key labels 410 may be updated to display three options "Play", "Delete", and "Save"; where "Play" plays back the recorded sound, "Delete" deletes the recorded sound, and "Save" saves the recorded sound.

If the user is reviewing images in play or review modes, it is possible that the displayed image will have a sound annotation attached. Should the user presses the "Delete" soft key 412, it is unclear what operation the user wishes to perform: delete the image, delete only the sound, or delete both. Indeed, an inexperienced user may not even consider all three of these possibilities before pressing the "Delete" button. Therefore, to guide the user through this operation, the dynamic overlay bars 430 and 432 are updated to prompt the user whether the image or the sound annotation is to be deleted, as shown in FIG. 8B. The user may then indicate which is to be deleted by pressing the corresponding soft key 412.

While reviewing images, it is also possible that the user may press the record button 426. If the current image already includes a sound annotation, then it is unclear whether the user wishes to record a new sound annotation over the old one, or whether the user is unaware of the existing sound annotation. Therefore, to make sure the user doesn't inadvertently overwrite the existing sound, the overlay bar 430 is automatically updated to inform the user that sound will not be recorded until the user deletes the existing sound, as shown in FIG. 8C. In addition, if the user doesn't recall the contents of the previous sound annotation, the user may listen to it before deleting it by pressing "Play", or the user may cancel the record operation altogether by pressing "Exit". Thus, according to the present invention the user is enabled to perform complex tasks in the camera without fumbling through a set of hierarchical menus.

Another use of displaying interactive instructions in the dynamic overlay bars 430 and 432 in accordance with the present invention is to direct the user through image capture sequences. The purpose of directed image capture sequences is to customize the camera's image capture process for a specific application. More specifically, a directed image capture is a camera feature that provides the user with interactive instructions and feedback during capture mode to guide the user through a series of task-oriented image captures.

Upon initiation of a directed image capture sequence, interactive instructions are displayed the dynamic overlay bars 430 and 432 that prompt the user to perform specific operations (capture image or capture sound), and for prompting the user to enter specific input (name and date). Customized directed image captures can be tailored to specific professions, such as insurance claims adjusters and real estate agents, who would benefit from the use of a digital camera to capture groups of related pictures.

Figure 9A:
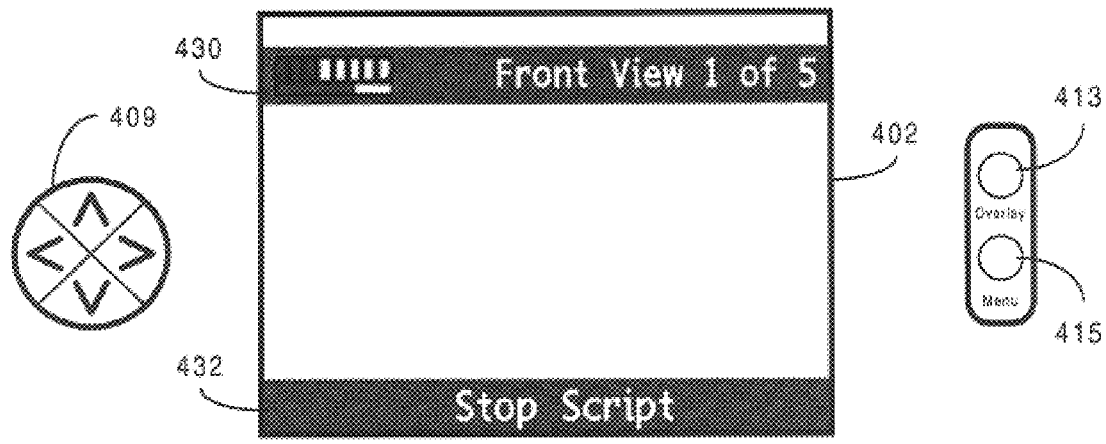
FIGS. 9A and 9B are diagrams illustrating example directed image capture screens.
Figure 9B:
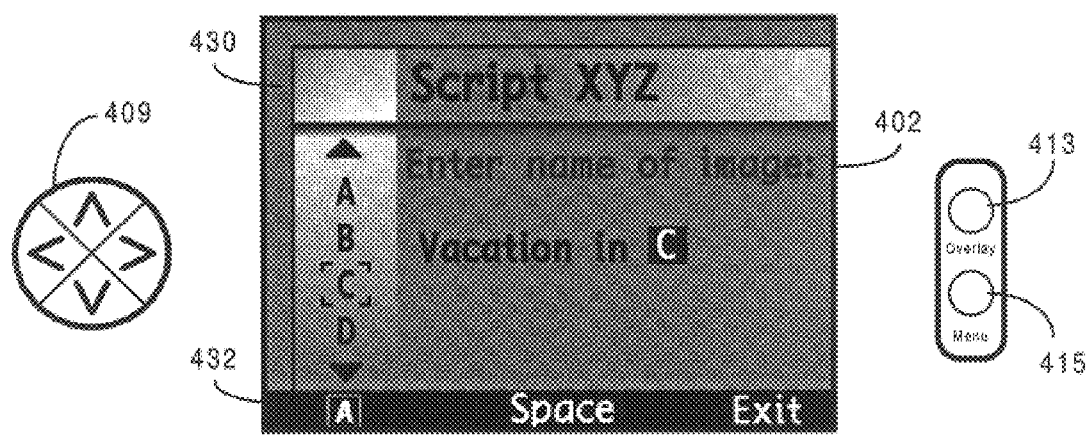

Referring now to FIGS. 9A and 9B, diagrams illustrating example directed image capture screens are shown. The example shown in FIG. 9A may pertain to an insurance-related directed image capture that prompts an insurance claims adjuster to take a series of pictures of a damaged vehicle, or it may pertain to a real estate application that guides a user through taking photos of a house for sale.

In the insurance example, once the directed image capture has started, the user may be instructed to take various views of the damaged car. The user may also be shown the number of the current image in that sequence, and the total number of images to be captured.

After the views of the car are taken, the directed image capture may then prompt the user to enter specific information, such as the name of the image, as shown in FIG. 9B. The user may then enter text by choosing letters using the four-way control button 409. For insurance purposes, the directed image capture may also request the user to input the owner's name, license plate number, claim number, and so on. The sequence of images and corresponding information may then be downloaded from the camera or to a host computer for automated database storage or web page generation.

In one embodiment of the present invention, one or more directed image capture sequences may be provided in the camera as built-in functions, especially if the camera is tailored for specific industries.

However, in a second aspect of the present invention, the camera is made more flexible by implementing the directed image capture sequences as a set of program instructions that are externally loaded into the camera. Once loaded in the camera 110, the instructions are then preferably executed by the GUI-based system software running on CPU 344.

Figure 10:
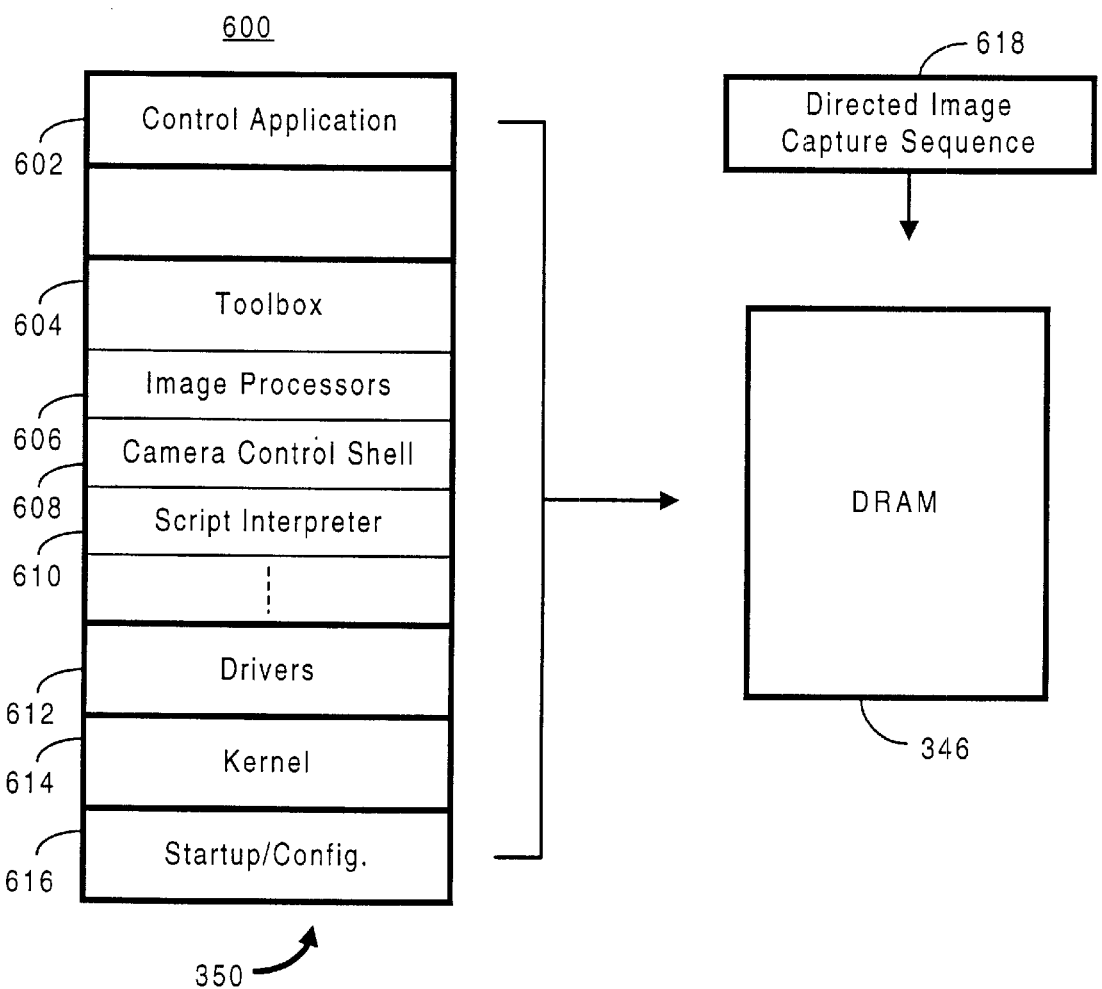
FIG. 10 is a block diagram illustrating the camera software, which is stored in ROM, and DRAM, where the software is executed.

FIG. 10 is a block diagram illustrating the contents of ROM 350 where the software is stored, and DRAM 346 where the software is executed. The software 600 may include a control application 602, a toolbox 604, drivers 612, a kernel 614, and a startup/configuration module 616. The control application 602 is the main program that controls high-level functions of the digital camera and is responsible for interfacing with functions in the toolbox 604.

Toolbox 604 comprises selected function modules that control how the digital camera captures and manipulates images. The modules may include image processors 606, a camera control shell 608, and a script interpreter 610. Image processors 606 are programs for enhancing (e.g., adjusting the contrast, sharpening, converting the image to gray-scale, etc.) the digital image received from imaging device 114. Camera control shell 608 receives and processes data structures for controlling camera functions. Script interpreter 610 translates and executes script statements, which are used to provide the directed image capture sequences and other camera 110 features, as explained below.

Drivers 612 comprise program instructions for controlling various camera 110 hardware components, such as motor 234 (FIG. 2) and a flash (not shown). Kernel 614 comprises program instructions providing basic underlying camera operating system services including synchronization routines, task creation, activation and deactivation routines, resource management routines, etc. Startup/configuration 616 comprises program instructions for providing initial camera 110 start-up routines such as the system boot routine and system diagnostics When the camera 110 is first turned on and booted up, the startup/configuration 616 module begins to execute and loads the drivers 612, the kernel 614, the control application 602, and system files containing configuration information into DRAM 346. Thereafter, operation of the camera is passed to the control application 602. In an alternative embodiment, the software 600 may executed out of ROM 350 in order to reduce the size of DRAM 346.

The directed image capture sequence 618 may be loaded into the digital camera 110 from the removable memory 354 (FIG. 3), a host computer, or a network, and stored in DRAM 346 to run in place of the control application 602. In a preferred embodiment, the directed image capture sequence 618 is implemented using a script, which is a program written with text-based commands that may be easily written by the user. As used herein, a script may be written in any intrepreted language, such as Basic and Lisp, for example.

Once loaded into the camera, the script may be selected by the user from a menu where it is displayed for selection, and is thereafter executed by the control application 602 by passing the script to the script interpreter 610. The script interpreter 610 then translates and executes the script instructions comprising the directed image capture sequence 618 one-by-one.

In an alternative embodiment, a directed image capture sequence 618 may be implemented as a traditional application program, rather than a script. However, an application program is typically written by a software developer in a traditional computer language, such as C++, compiled, and stored in machine language, which is a more complicated process than adding new functions to the camera via a text-based interpreted script.

Figure 11:
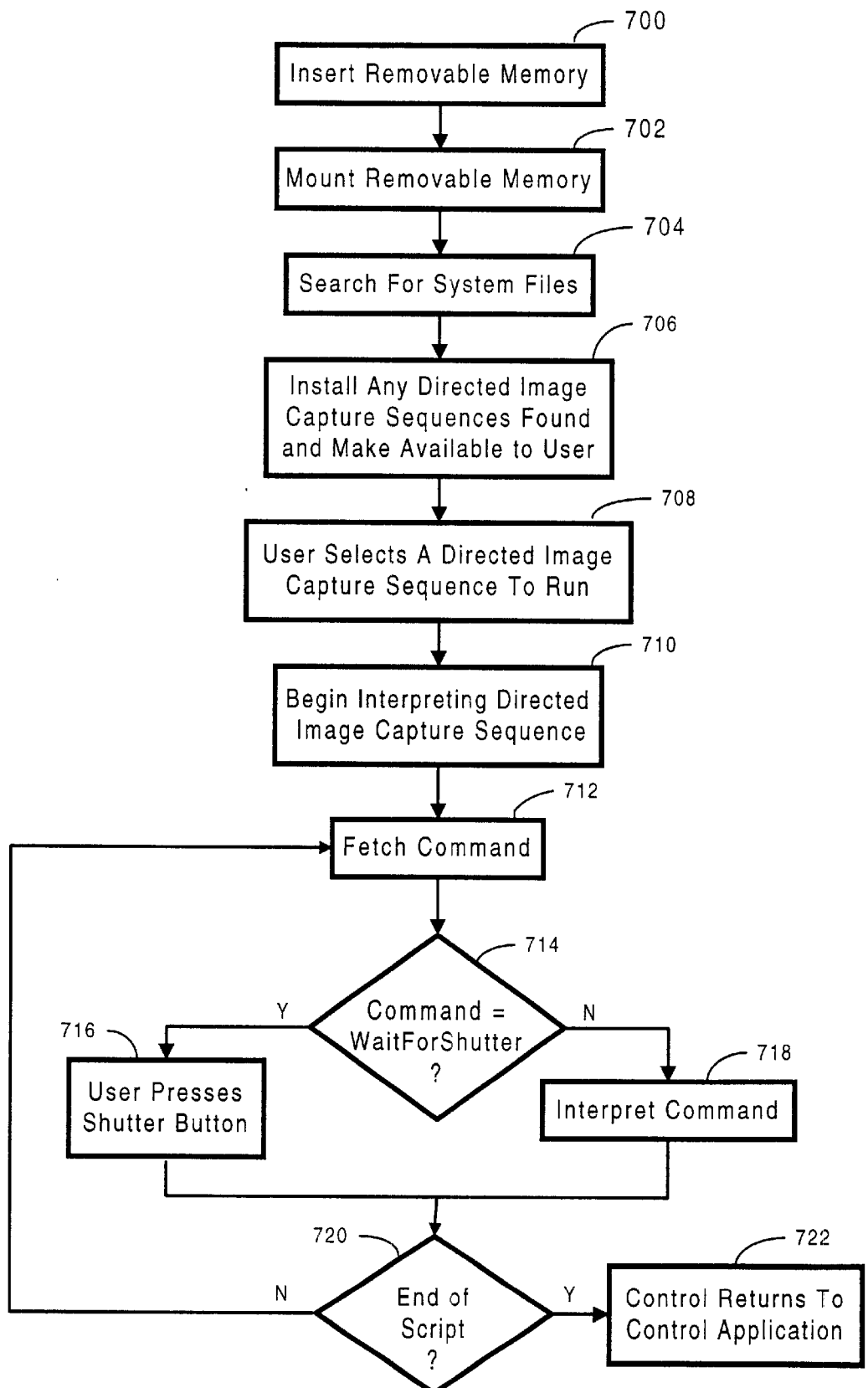
FIG. 11 is a flow chart illustrating an exemplary process of installing and running a script-based directed image capture in a preferred embodiment of the present invention.

FIG. 11 is a flow chart illustrating an exemplary process of installing and running a script-based directed image capture in a preferred embodiment of the present invention.

The process begins by inserting the removable memory 354 in step 700. When the removable memory 354 is installed, the removable memory 354 is mounted by the operating system 600 in step 702. Thereafter, the operating system searches for system files on the removable memory 354, which alert the digital camera 110 to the presence of an external program, in step 704.

Any system files found on the removable memory 354 and corresponding directed image capture sequences 618 are then installed and made available to the user for selection via menu choices that appear on the LCD screen 402 in step 706. In a preferred embodiment, steps 704 and 706 are implemented as a hot-mount process when the removable memory 354 is inserted into the camera 110, as described in U.S. patent application Ser. No. 09/032385 entitled "Method And System For Dynamically Updating Software Functions In A Digital Capture Device (P149)," filed on Feb. 26, 1998, which is assigned to assignee of the present application and herein incorporated by reference.

Once the list of available directed image capture sequences 618 are displayed, the user selects one of the directed image capture sequences 618 to run in step 708. In a preferred embodiment, the list showing the available directed image capture sequences may be categorized in menus for easier selection. For example, assume a real estate agent has three different scripts for capturing images of different types of properties. The agent may name or create categories for the directed image capture sequences called "commercial", "industrial", and "residential", for instance. Selecting the residential category, for example, will cause a list of directed image captures to be displayed that are designed to capture pictures of different types of residential properties, such as one, two, and three bedroom homes. The user may then select a desired script depending on the particular house to be shot.

In one preferred embodiment, the directed image capture selections displayed in the menus may be erased from the camera by rebooting the camera, or by removing the removable memory 354 from the camera 110.

After the user selects one of the directed image capture sequences 618 to run, the script interpreter 610 begins interpreting the directed image capture sequence 618 in step 710, and control is passed from the control application 602 to the script. In step 712, the script interpreter 610 fetches the first command comprising the directed image capture sequence 618.

It is then determined whether the fetched command is a script "WaitForShutter" command in step 714. This command causes control of the camera 110 to pass back to the control application 602 until the user presses the shutter button 418 to capture an image. The "WaitForShutter" command is preferably called with a quoted string parameter that is used in the dynamic overly bar 430 as the prompt to the user requesting an image capture (e.g., "Take photo of kitchen").

If the command is a "WaitForShutter" command in step 714, then control is returned to the script after the user presses the shutter button 418 in step 716 to capture an image. If the fetched command is not a "WaitForShutter" command in step 714, then the script interpreter 610 interprets and executes the command in step 718.

After the user presses the shutter button 418 or after a script command has been executed, it is determined if the end of the script has been reached in step 720. If not, then the next command is fetched in step 712, and the process continues until the end of the script is reached, at which point control is returned to the control application 602 in step 722.

Besides the "WaitForShutter" command, scripts may include two other categories of script commands. One category of commands pertain to camera settings, controls and other camera parameters specific to the subject and/or scene being captured. (ie: White Balance Modes, Exposure Modes, and Focus Modes). This category of commands enable users to input "Hints" optimizing the camera's photo systems for specific photographic conditions.

The other category of commands may pertain to file system operations and image tagging functions specific to the way in which image data is stored in memory. (ie: Guided Capture, Prompted Text/Audio Annotation, and Automated Image Grouping/Cataloging/Indexing.) This category of commands is particularly useful when used in conjunction with desktop computer applications where the hosting application is coordinated to take advantage of the preformatted media organization and tag information. For example, while a directed image capture sequence guides the user though a series of steps to create an image grouping, the script commands comprising the sequence generate appropriate tags and data structures to group the images and text captured during the sequence.

No matter whether the dynamic overlay bars of the present invention are used to display status information, soft key labels, or interactive instructions, as described herein, one important component affecting the user's experience is the method used to display the overlay bars on the image.

One approach would be the follow prior art techniques for displaying text (e.g. image name) over an image. This approach typically includes the following steps: 1) fetching the image to be displayed, which is typically stored in JPEG format, 2) decompressing and resizing the image, 3) displaying the decompressed image block-by-block, and then after the image is fully displayed, 4) writing the text on top of the image.

The problem with this method is that is visually unappealing to the user, and it reduces the performance of camera when the user turns-off the text display while viewing the image. The reason the method reduces camera performance is the following. When text or graphics are displayed over the image, they obscure a portion of the image. And when the text is turned-off, the obscured portions of the image must be displayed so that the original image is seen without the text. In order to do this, however, the entire JPEG image must be fetched and decompressed again so that the obscured portions of the image can be displayed on the LCD, which can be a time consuming operation.

A third aspect of the present invention overcomes these disadvantages by providing an improved method and system for displaying the overlay bars that not only enhances the visual effect associated with the overlay bars, but also eliminates the need to re-decompress the JPEG image data when the user turns-off the overlay bars, thereby increasing performance of the camera.

According to this aspect of the present invention, the overlay bars are displayed first, followed by the image, wherein the image is made to appear as though it is sliding underneath the overlay bars as it is being displayed. The image appears as though is it is sliding underneath the overlay bars because the image is displayed on the LCD screen 402 line-by-line or block-by-block (as used herein, a block may include anywhere from one line to sixteen lines of image data). As the display of the image progresses from the top of the screen 402, the image therefore appears to be displayed behind the overlay bars 430 and 432 which are already present on the LCD screen 402.

Figure 12A:
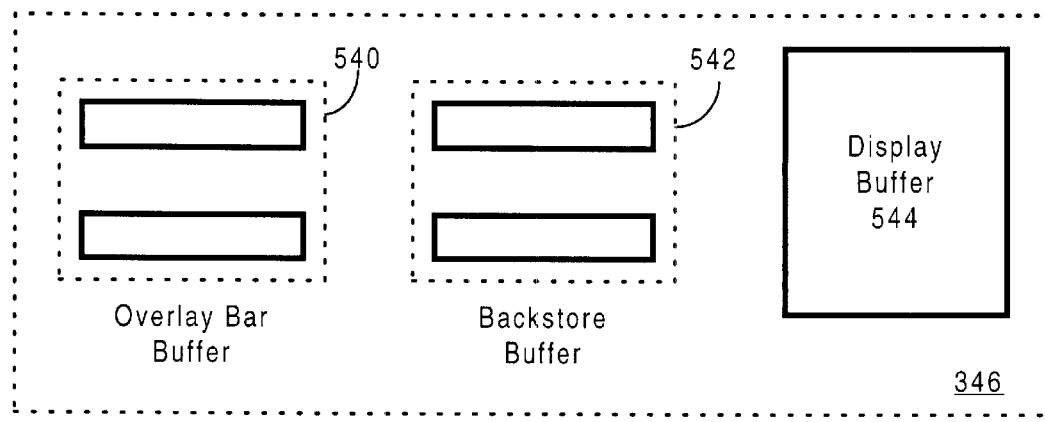
FIG. 12A is a diagram illustrating a memory buffer organization for displaying overlay bars.

The overlay bars 430 and 432 are also provided with a translucent background so that so that the overlay bars 430 and 432 themselves do not obscure the image, but the text is easily distinguishable from the colors of the displayed image. The result is that after the image has been displayed, the overlay bars appear as a separate layer over the image. Further, the portions of the original image that intersect with the overlay bars 430 and 432 are saved, so that when the user turns-off the overlay bars 430 and 432, only these portions of the image are redisplayed to restore the image. Thus this aspect of the present invention eliminates the need to re-decompress and display the entire image again, thereby increasing system performance.

Where typically, specialized hardware would be required to achieve the above-described effects, the present invention accomplishes the task through software and the manipulation of several memory buffers, as shown in FIG. 12A.

FIG. 12A is a diagram illustrating a buffer organization for displaying overlay bars, which in a preferred embodiment, resides in DRAM 346. The buffer organization includes an overlay bar buffer 540, a backstore buffer 542, and a display buffer 544. According to the present invention, the overlay bar buffer 540 is used to store the graphics data (graphics and text) that will be displayed in the overlay bars 430 and 432. In a preferred embodiment the overlay bar buffer 540 is divided into a top and bottom portion, which store twenty lines of data each that correspond to the top and bottom overlay bar 430 and 432, respectively.

The backstore buffer 542 is used to store original image data corresponding to the area of the LCD screen 402 where the overlay bars 430 and 432 will be displayed. The backstore buffer 542 is also divided into a top and bottom portion that are the same size as the top and bottom portions of the overlay bar buffer 540.

As is typical in most rendering systems, the display buffer 544 is used to store the actual data that is to be displayed on the LCD. The data in the display buffer is accessed by LCD controller 390 (FIG. 3) and displayed on the LCD.

Figure 12B:
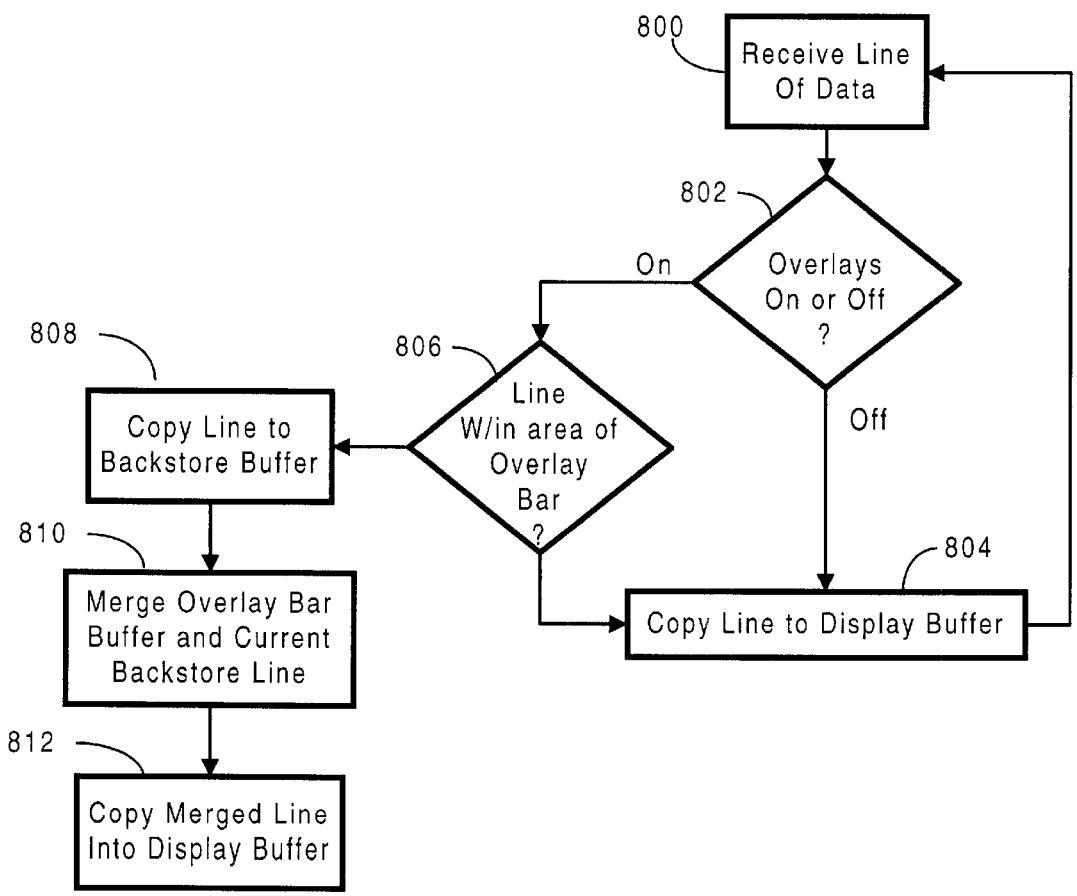
FIG. 12B is a flow chart illustrating the process of displaying overlay bars on the LCD in accordance with the present invention.

FIG. 12B is a flow chart illustrating the process of displaying overlay bars on the LCD in accordance with the present invention. The first step in the process is to preferably receive an input line of decompressed image data from an image processing system in step 800. The process may also be modified to receive an input block of decompressed image data. In a preferred embodiment, the image processing system for providing the input data may include an image decompressor for decompressing the image data, and a resizer for resizing the lines of image data to fit the size of LCD screen 402.

Next, it is determined whether the overlay bars 430 and 432 are turned-on or off in step 802. If the overlay bars are turned-off, then the line of image data is copied directly to the display buffer 544 in step 804 for display on the LCD screen 402 and the process continues. If the overlay bars remain off for the duration of the time it takes to display the image line-by-line or block-by-block, then the entire image is displayed on the LCD screen 402 using only the display buffer 544.

If the overlay bars are turned-on in step 802, then it is determined whether the line of data will be displayed within the area of the LCD screen 402 that is occupied by an overlay bar in step 806. If the line is within an overlay bar, the line is copied into the backstore buffer 542 in step 808. The purpose of copying the line to the backstore buffer 542 is to save the portion of the image that will be displayed underneath the overlay bars 430 and 432.

After the current line of image data is copied into the backstore buffer 542, the corresponding line stored in the overlay bar buffer 540 is merged with the current line in the backstore buffer 542 in step 810. The purpose of merging the two lines is to display the background of the overlay bars 430 and 432 translucently over the image on the LCD screen 402. This is done by halving the luminance value of each pixel of the image data from the backstore buffer 542 that falls within the bounds of an overlay bar 430 or 432, and overwriting each pixel in the line of image data that falls under a pixel of text or graphic data from the overlay bar buffer 540. Halving the luminance value of the image data causes the colors of the image that overlap an overlay bar 430 or 432 to be half as bright, thus giving the overlay bar 430 or 432 a translucent appearance and allowing the user to see the image through the overlay bar 430 or 432, as shown in FIG. 7B. In an alternative embodiment, the translucency of the overlay bars 430 and 432 is provided by increasing, rather than decreasing, the luminance value of each image pixel falling within the area of an overlay bar. In this case, the text displayed in the overlay bars 430 and 432 is displayed using a dark color.

As the line from the overlay bar buffer 540 is merged with the line from the backstore buffer 542, the resulting merged line is written into the display buffer 544 for display in step 812. If the current line is the last line of image data in step 814, then the process ends. Otherwise the next line of image data is received in step 800 and the process continues. In an alternate embodiment of the present invention, the determination of whether the overlay bars 802 are on/off in step 802 may be performed after copying the input line to the backstore buffer 542 in step 8. In this embodiment, the input line is copied into the backstore buffer 542 even when the overlay bars 430 and 432 are off.

In a preferred embodiment of present invention, the software 600 controlling the digital camera 110 is implemented as event driven software, which responds to input from the user (select menu, press button, etc.) or other applications at unregulated times. When, for example, the user first switches to play mode and/or selects a new image to display, the first steps that are performed in the process are to blank the LCD screen 402, fill the overlay bar buffer 540 with relevant mode-specific information, and then contents of the overlay bar buffer 540 and the backstore buffer 542 are merged and written to the display buffer 544. In this case, the backstore buffer 542 may contain black or white pixel values to provide the blank screen. Thereafter, the process proceed as described in FIG. 13.

If the user turns-off the overlay bars 430 and 432 while an image is displayed, then the process is interrupted and software 600 copies the entire contents of the backstore buffer 542, which contains the original image data, to the display buffer 544 for display. This causes the overlay bars to disappear from the LCD screen 402 and restores the original image without having to re-decompress and display the entire image over again.

If the user then turns-on the overlay bars 430 and 432, the software 600 merges the contents of the overlay bar buffer 540 and the backstore buffer 542 to provide the translucent bars and text over the image, and then copies the result to the display buffer 544 for display. This may be done by executing step 812 and 814 for each line of the data in the buffers 540 and 542.

Also, when the overlay bars 430 and 432 are on, if the overlay bars 430 and 432 are updated by the control application 602 due to a change in status or instructions, the contents of the overlay bar buffer 540 and the backstore buffer 542 are remerged and written into the display buffer 544 for display.

A method and system for displaying overlay bars in a digital imaging device has been disclosed. The overlay bars enable a user to apply camera functions and features to images with minimum effort, while allowing for easy viewing of the image. In addition, the overlay bars are used to display interactive instructions to the user in the form of directed image capture to guide the user through complex task, without the need for help screens or for the user to remember complicated key sequences. Finally, the method and system used to display overlay bars eliminates the need to re-decompress and display the image when the user turns-off the overlay bars, which increases the responsiveness of the camera.

Although the present invention has been described in accordance with the embodiments shown, one of ordinary skill in the art will readily recognize that there could be variations to the embodiments and those variations would be within the spirit and scope of the present invention. For example, the functions assigned to the soft keys, the number of soft keys, and the placement of the soft keys and labels in and around the display may vary. The method and system may also be implemented in digital imaging devices having only two modes, but that have multiple navigation screens within the "play mode" Accordingly, many modifications may be made by one of ordinary skill in the art without departing from the spirit and scope of the appended claims.

What is claimed is:

1. A method for displaying an overlay bar on a digital imaging device comprising the steps of:
   a) displaying the overlay bar in a predetermined area of a display screen for displaying text information, the overlay bar comprising a plurality of pixels corresponding to the text information;
   b) providing an image to display on the display screen, the image comprising a plurality of pixels having luminance values; and
   c) displaying the image by
      i) modifying the luminance value of each pixel of the image data that falls within the area of the overlay bar, and
      ii) overwriting each pixel of image data that falls under a pixel of text in the overlay bar,
   wherein modifying the luminance values of the image data provides the overlay bar with a translucent appearance thereby enabling a user to see the image through the overlay bar.

2. A method as in claim 1 wherein step ci) further includes the steps of saving each pixel of the image data that falls within the area of the overlay bar, creating saved image data; and in response to the user turning-off the overlay bar, displaying the saved image data on the display screen, thereby eliminating the need to re-display the entire image.

3. A method as in claim 2 wherein step a) further includes the step of providing the overlay bar with graphic information.

4. A method as in claim 3 wherein step ci) for modifying the luminance values includes the step of decreasing the luminance values.

5. A method as in claim 3 wherein step ci) for modifying the luminance values includes the step of increasing the luminance values.

6. A method as in claim 3 wherein step c) further includes the step of displaying the image line-by-line.

7. A method as in claim 3 wherein step c) further includes the step of displaying the image block-by-block.

* * * * *

(12) EX PARTE REEXAMINATION CERTIFICATE (7961st)
United States Patent
Ramirez et al.

(10) Number: US 6,504,575 C1
(45) Certificate Issued: Jan. 4, 2011

(54) METHOD AND SYSTEM FOR DISPLAYING OVERLAY BARS IN A DIGITAL IMAGING DEVICE

(75) Inventors: Michael A. Ramirez, Palo Alto, CA (US); Eric C. Anderson, San Jose, CA (US)

(73) Assignee: Flashpoint Technology, Inc., San Jose, CA (US)

Reexamination Request:
No. 90/010,677, Oct. 2, 2009
No. 90/009,692, Feb. 22, 2010

Reexamination Certificate for:
Patent No.: 6,504,575
Issued: Jan. 7, 2003
Appl. No.: 09/032,177
Filed: Feb. 27, 1998

(51) Int. Cl.
*H04N 5/278* (2006.01)
*H04N 5/232* (2006.01)
*H04N 1/00* (2006.01)

(52) U.S. Cl. .................. 348/333.02; 348/333.11; 348/E5.047; 348/E5.06

(58) Field of Classification Search .................. None
See application file for complete search history.

(56) References Cited

U.S. PATENT DOCUMENTS

| | | |
|---|---|---|
| 2,289,555 A | 7/1942 | Simons |
| 3,814,227 A | 6/1974 | Stern |
| 3,971,065 A | 7/1976 | Bayer |
| 3,991,625 A | 11/1976 | Preston |
| 4,011,571 A | 3/1977 | Okuzawa |
| 4,017,680 A | 4/1977 | Anderson et al. |
| 4,125,111 A | 11/1978 | Hudspeth et al. |
| 4,158,208 A | 6/1979 | Dischert |
| 4,172,327 A | 10/1979 | Kuehn et al. |
| 4,195,317 A | 3/1980 | Stratton |
| 4,234,890 A | 11/1980 | Astle |
| 4,325,080 A | 4/1982 | Satoh |
| 4,337,479 A | 6/1982 | Tomimoto et al. |
| 4,347,618 A | 8/1982 | Kavouras et al. |
| 4,364,650 A | 12/1982 | Terashita et al. |
| 4,403,303 A | 9/1983 | Howes et al. |
| 4,416,282 A | 11/1983 | Saulson |
| 4,456,931 A | 6/1984 | Toyoda et al. |
| 4,466,230 A | 8/1984 | Osselaere |
| 4,470,067 A | 9/1984 | Mino |

(Continued)

FOREIGN PATENT DOCUMENTS

EP 0122094 A2 10/1984

(Continued)

OTHER PUBLICATIONS

Foley et al., *Computer Graphics—Principles and Practice, Second Edition in C*, Addison–Wesley Publishing Company, New York, 1996, pp. 132–137, 506–509, 755–759.
Buderi, Robert, "Photos That Talk," *Upside Today*, Jan. 27, 1999, <http://www.uspide.com/texis/mvm/story?id=36b0cb860>.

(Continued)

*Primary Examiner*—Andrew L Nalven

(57) ABSTRACT

A method and system for displaying an overlay bar on a digital imaging device is disclosed. First, text and graphic information to be displayed on the overlay bar are stored in an overlay bar buffer, and then displayed on a display screen. Thereafter, an image to be viewed is displayed on the display line-by-line. The lines of the image that are to be displayed within the area of an overlay bar are stored in a backstore buffer. Each line in the backstore buffer is then merged with its corresponding lines in the overlay bar buffer and displayed. The merging operation is performed by modifying the luminance value of each pixel of the image data that falls within the area of the overlay bar, and overwriting each pixel of image data that falls under a pixel of text in the overlay bar. This makes the overlay appear to the user to be translucent and makes the image appear as though it is sliding beneath the overlay bar as it is being displayed. When the user turns-off the overlay bars, only the portions of the image stored in the backstore buffer need be re-displayed to provide the original image, thus eliminating the need to re-display the entire image.

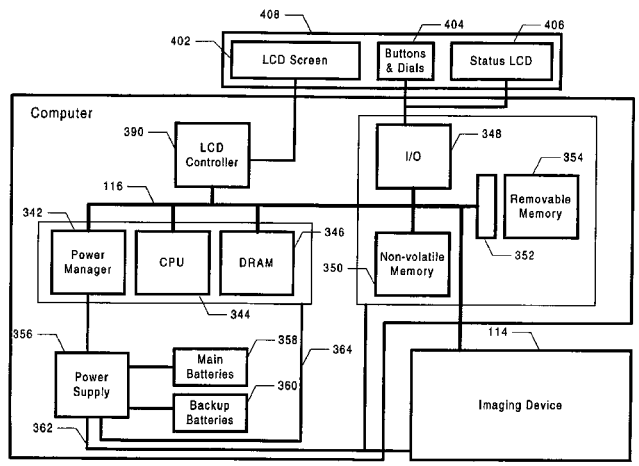

U.S. PATENT DOCUMENTS

| | | |
|---|---|---|
| 4,471,382 A | 9/1984 | Toyoda et al. |
| 4,519,692 A | 5/1985 | Michalik |
| 4,531,161 A | 7/1985 | Murakoshi |
| 4,540,276 A | 9/1985 | Ost |
| 4,574,319 A | 3/1986 | Konishi |
| 4,601,055 A | 7/1986 | Kent |
| 4,623,930 A | 11/1986 | Oshima et al. |
| 4,691,253 A | 9/1987 | Silver |
| 4,723,169 A | 2/1988 | Kaji |
| 4,736,224 A | 4/1988 | Watanabe |
| 4,739,409 A | 4/1988 | Baumeister |
| 4,772,941 A | 9/1988 | Noble |
| 4,774,600 A | 9/1988 | Baumeister |
| 4,823,283 A | 4/1989 | Diehm |
| 4,827,347 A | 5/1989 | Bell |
| 4,855,831 A | 8/1989 | Miyamoto |
| 4,866,292 A | 9/1989 | Takemoto et al. |
| 4,882,683 A | 11/1989 | Rupp et al. |
| 4,887,161 A | 12/1989 | Watanabe et al. |
| 4,888,812 A | 12/1989 | Dinan et al. |
| 4,893,198 A | 1/1990 | Little |
| 4,907,089 A | 3/1990 | Yamaguchi |
| 4,916,435 A | 4/1990 | Fuller |
| 4,935,809 A | 6/1990 | Hayashi et al. |
| 4,937,676 A | 6/1990 | Finelli et al. |
| 4,937,685 A | 6/1990 | Barker et al. |
| 4,965,675 A | 10/1990 | Hori |
| 4,972,495 A | 11/1990 | Blike et al. |
| 4,982,291 A | 1/1991 | Kurahashi |
| 4,992,887 A | 2/1991 | Aragaki |
| 5,001,697 A | 3/1991 | Torres |
| 5,007,027 A | 4/1991 | Shimoi |
| 5,016,107 A | 5/1991 | Sasson |
| 5,018,017 A | 5/1991 | Sasaki et al. |
| 5,020,012 A | 5/1991 | Stockberger |
| 5,021,989 A | 6/1991 | Fujisawa et al. |
| 5,027,150 A | 6/1991 | Inoue |
| 5,031,329 A | 7/1991 | Smallidge |
| 5,032,918 A | 7/1991 | Ota et al. |
| 5,032,926 A | 7/1991 | Imai et al. |
| 5,034,804 A | 7/1991 | Sasaki et al. |
| 5,040,068 A | 8/1991 | Parulski |
| 5,040,070 A | 8/1991 | Higashitsutsumi |
| 5,043,801 A | 8/1991 | Watanabe |
| 5,043,816 A | 8/1991 | Nakano |
| 5,057,924 A | 10/1991 | Yamada |
| 5,063,600 A | 11/1991 | Norwood |
| 5,065,246 A | 11/1991 | Takemoto et al. |
| 5,067,029 A | 11/1991 | Takahashi |
| 5,070,406 A | 12/1991 | Kinoshita |
| 5,073,823 A | 12/1991 | Yamada et al. |
| 5,077,582 A | 12/1991 | Kravette et al. |
| 5,083,383 A | 1/1992 | Heger |
| 5,093,716 A | 3/1992 | Kondo et al. |
| 5,099,262 A | 3/1992 | Tanaka et al. |
| 5,101,225 A | 3/1992 | Wash |
| 5,101,364 A | 3/1992 | Davenport |
| 5,106,107 A | 4/1992 | Justus |
| 5,122,827 A | 6/1992 | Saegusa et al. |
| 5,123,088 A | 6/1992 | Kasahara et al. |
| 5,124,537 A | 6/1992 | Chandler et al. |
| 5,124,814 A | 6/1992 | Takahashi et al. |
| 5,130,812 A | 7/1992 | Yamaoka |
| 5,138,459 A | 8/1992 | Roberts |
| 5,138,460 A | 8/1992 | Egawa |
| 5,140,358 A | 8/1992 | Tokunaga |
| 5,142,319 A | 8/1992 | Wakabayashi |
| 5,144,358 A | 9/1992 | Tsuru et al. |
| 5,144,445 A | 9/1992 | Higashitsutsumi |
| 5,146,353 A | 9/1992 | Isoguchi et al. |
| 5,153,729 A | 10/1992 | Saito |
| 5,153,730 A | 10/1992 | Nagasaki |
| 5,159,364 A | 10/1992 | Yanagisawa et al. |
| 5,161,012 A | 11/1992 | Choi |
| 5,161,025 A | 11/1992 | Nakao |
| 5,161,535 A | 11/1992 | Short |
| 5,164,751 A | 11/1992 | Weyer |
| 5,164,831 A | 11/1992 | Kuchta |
| 5,179,653 A | 1/1993 | Fuller |
| 5,187,776 A | 2/1993 | Yanker |
| 5,189,404 A | 2/1993 | Masimo et al. |
| 5,189,490 A | 2/1993 | Shetty |
| 5,193,538 A | 3/1993 | Ekwall |
| 5,194,944 A | 3/1993 | Uchiyama |
| 5,198,851 A | 3/1993 | Ogawa |
| 5,199,101 A | 3/1993 | Cusick et al. |
| 5,200,818 A | 4/1993 | Neta et al. |
| 5,218,459 A | 6/1993 | Parulski et al. |
| 5,218,647 A | 6/1993 | Blonstein |
| 5,220,420 A | 6/1993 | Hoarty et al. |
| 5,220,614 A | 6/1993 | Crain |
| 5,223,935 A | 6/1993 | Tsuji |
| 5,224,207 A | 6/1993 | Filion et al. |
| 5,229,856 A | 7/1993 | Koshiishi |
| 5,231,511 A | 7/1993 | Kodama et al. |
| 5,231,651 A | 7/1993 | Ozaki |
| 5,237,648 A | 8/1993 | Mills |
| 5,237,650 A | 8/1993 | Priem et al. |
| 5,239,419 A | 8/1993 | Kim |
| 5,247,321 A | 9/1993 | Kazami |
| 5,247,327 A | 9/1993 | Suzuka |
| 5,253,071 A | 10/1993 | MacKay |
| 5,260,795 A | 11/1993 | Sakai |
| 5,262,863 A | 11/1993 | Okada |
| 5,262,867 A | 11/1993 | Kojima |
| 5,262,868 A | 11/1993 | Kaneko et al. |
| 5,262,869 A | 11/1993 | Hong |
| 5,270,821 A | 12/1993 | Samuels |
| 5,270,831 A | 12/1993 | Parulski et al. |
| 5,274,458 A | 12/1993 | Kondo et al. |
| 5,276,563 A | 1/1994 | Ogawa |
| 5,283,560 A | 2/1994 | Bartlett |
| 5,283,792 A | 2/1994 | Davies |
| 5,287,192 A | 2/1994 | Iizuka |
| 5,301,026 A | 4/1994 | Lee |
| 5,302,997 A | 4/1994 | Cocca |
| 5,307,318 A | 4/1994 | Nemoto |
| 5,309,243 A | 5/1994 | Tsai |
| 5,311,240 A | 5/1994 | Wheeler |
| 5,331,366 A | 7/1994 | Tokunaga |
| 5,335,072 A | 8/1994 | Tanaka et al. |
| 5,341,466 A | 8/1994 | Perlin |
| 5,343,246 A | 8/1994 | Arai et al. |
| 5,343,386 A | 8/1994 | Barber |
| 5,343,509 A | 8/1994 | Dounies |
| 5,345,552 A | 9/1994 | Brown |
| 5,359,427 A | 10/1994 | Sato |
| 5,359,728 A | 10/1994 | Rusnack |
| 5,367,318 A | 11/1994 | Beaudin et al. |
| 5,373,153 A | 12/1994 | Cumberledge |
| 5,375,160 A | 12/1994 | Guidon et al. |
| 5,386,111 A | 1/1995 | Zimmerman |
| 5,386,177 A | 1/1995 | Uhm |
| 5,386,552 A | 1/1995 | Garney |
| 5,390,026 A | 2/1995 | Lim |
| 5,390,314 A | 2/1995 | Swanson |
| 5,392,462 A | 2/1995 | Komaki |
| 5,396,343 A | 3/1995 | Hanselman |
| 5,402,170 A | 3/1995 | Parulski et al. |
| 5,402,171 A | 3/1995 | Tagami et al. |
| 5,404,316 A | 4/1995 | Klingler et al. |

| | | | | | | |
|---|---|---|---|---|---|---|
| 5,404,505 A | 4/1995 | Levinson | | 5,548,409 A | 8/1996 | Ohta et al. |
| 5,408,265 A | 4/1995 | Sasaki | | 5,550,646 A | 8/1996 | Hassan et al. |
| 5,414,811 A | 5/1995 | Parulski et al. | | 5,550,938 A | 8/1996 | Hayakawa et al. |
| 5,416,556 A | 5/1995 | Suzuki et al. | | 5,552,806 A | 9/1996 | Lenchik |
| 5,420,635 A | 5/1995 | Konishi et al. | | 5,553,277 A | 9/1996 | Hirano et al. |
| 5,425,137 A | 6/1995 | Mohan et al. | | 5,555,193 A | 9/1996 | Tsinberg et al. |
| 5,428,733 A | 6/1995 | Carr | | 5,559,554 A | 9/1996 | Uekane et al. |
| 5,432,871 A | 7/1995 | Novik | | 5,560,022 A | 9/1996 | Dunstan et al. |
| 5,432,900 A | 7/1995 | Rhodes et al. | | 5,563,655 A | 10/1996 | Lathrop |
| 5,434,618 A | 7/1995 | Hayashi et al. | | 5,568,167 A | 10/1996 | Galbi |
| 5,434,958 A | 7/1995 | Surma et al. | | 5,568,192 A | 10/1996 | Hannah |
| 5,434,969 A | 7/1995 | Heilveil et al. | | 5,572,233 A | 11/1996 | Kakegawa |
| 5,436,657 A | 7/1995 | Fukuoka | | 5,574,933 A | 11/1996 | Horst |
| 5,436,659 A | 7/1995 | Vincent | | 5,576,757 A | 11/1996 | Roberts et al. |
| 5,440,401 A | 8/1995 | Parulski et al. | | 5,576,759 A | 11/1996 | Kawamura et al. |
| 5,442,465 A | 8/1995 | Compton | | 5,577,190 A | 11/1996 | Peters |
| 5,444,482 A | 8/1995 | Misawa et al. | | 5,578,757 A | 11/1996 | Roth |
| 5,448,372 A | 9/1995 | Axman et al. | | 5,579,048 A | 11/1996 | Hirasawa |
| 5,452,145 A | 9/1995 | Wakui et al. | | 5,579,450 A | 11/1996 | Hanyu |
| 5,459,830 A | 10/1995 | Ohba et al. | | 5,581,311 A | 12/1996 | Kuroiwa |
| 5,461,429 A | 10/1995 | Konishi et al. | | 5,585,845 A | 12/1996 | Kawamura |
| 5,463,728 A | 10/1995 | Blahut et al. | | 5,587,740 A | 12/1996 | Brennan |
| 5,463,729 A | 10/1995 | Kitaguchi | | 5,589,902 A | 12/1996 | Gruel et al. |
| 5,465,133 A | 11/1995 | Aoki et al. | | 5,590,306 A | 12/1996 | Watanabe et al. |
| 5,467,288 A | 11/1995 | Fasciano et al. | | 5,592,301 A | 1/1997 | Shimada |
| 5,473,370 A | 12/1995 | Moronaga et al. | | 5,594,524 A | 1/1997 | Sasagaki |
| 5,473,371 A | 12/1995 | Choi | | 5,597,193 A | 1/1997 | Conner |
| 5,475,428 A | 12/1995 | Hintz et al. | | 5,606,365 A | 2/1997 | Maurinus |
| 5,475,441 A | 12/1995 | Parulski et al. | | 5,608,491 A | 3/1997 | Sasagaki |
| 5,475,812 A | 12/1995 | Corona et al. | | 5,610,653 A | 3/1997 | Abecassis |
| 5,477,264 A | 12/1995 | Sarbadhikari et al. | | 5,619,738 A | 4/1997 | Petruchik |
| 5,481,330 A | 1/1996 | Yamasaki | | 5,621,459 A | 4/1997 | Ueda |
| 5,481,667 A | 1/1996 | Bieniek et al. | | 5,621,906 A | 4/1997 | O'Neill |
| 5,486,853 A | 1/1996 | Baxter | | 5,625,412 A | 4/1997 | Aciu et al. |
| 5,488,414 A | 1/1996 | Hirasawa | | 5,630,017 A | 5/1997 | Gasper et al. |
| 5,489,945 A | 2/1996 | Kannegundla | | 5,631,701 A | 5/1997 | Miyake |
| 5,489,955 A | 2/1996 | Satoh | | 5,631,871 A | 5/1997 | Park et al. |
| 5,493,332 A | 2/1996 | Dalton et al. | | 5,633,573 A | 5/1997 | Van Phuoc et al. |
| 5,493,335 A | 2/1996 | Parulski et al. | | 5,633,678 A | 5/1997 | Parulski et al. |
| 5,495,342 A | 2/1996 | Harigaya | | 5,633,976 A | 5/1997 | Ogino |
| 5,495,559 A | 2/1996 | Makino | | 5,634,000 A | 5/1997 | Wicht |
| 5,496,106 A | 3/1996 | Anderson | | 5,635,983 A | 6/1997 | Ohmori |
| 5,497,193 A | 3/1996 | Mitsuhashi | | 5,635,984 A | 6/1997 | Lee |
| 5,500,936 A | 3/1996 | Allen et al. | | 5,637,871 A | 6/1997 | Piety et al. |
| 5,502,486 A | 3/1996 | Ueda | | 5,638,123 A | 6/1997 | Yamaguchi |
| 5,510,830 A | 4/1996 | Ohia et al. | | 5,638,498 A | 6/1997 | Tyler et al. |
| 5,512,941 A | 4/1996 | Takahashi | | 5,638,501 A | 6/1997 | Gough et al. |
| 5,513,306 A | 4/1996 | Mills | | 5,640,193 A | 6/1997 | Wellner |
| 5,513,342 A | 4/1996 | Leong et al. | | 5,640,202 A | 6/1997 | Kondo |
| 5,515,101 A | 5/1996 | Yoshida | | 5,640,204 A | 6/1997 | Tsutsui |
| 5,517,606 A | 5/1996 | Matheny et al. | | 5,640,627 A | 6/1997 | Nakano |
| 5,519,815 A | 5/1996 | Klassen | | 5,644,694 A | 7/1997 | Appleton |
| 5,521,639 A | 5/1996 | Tomura | | 5,648,816 A | 7/1997 | Wakui |
| 5,521,663 A | 5/1996 | Norris | | 5,649,032 A | 7/1997 | Burt et al. |
| 5,521,717 A | 5/1996 | Maeda | | 5,649,186 A | 7/1997 | Ferguson |
| 5,521,841 A | 5/1996 | Arman et al. | | 5,651,107 A | 7/1997 | Frank et al. |
| 5,523,786 A | 6/1996 | Parulski | | 5,659,547 A | 8/1997 | Scarr et al. |
| 5,523,857 A | 6/1996 | Fukushima | | 5,659,729 A | 8/1997 | Nielsen |
| 5,525,957 A | 6/1996 | Tanaka | | 5,664,087 A | 9/1997 | Tani et al. |
| 5,528,293 A | 6/1996 | Watanabe | | 5,666,580 A | 9/1997 | Ito et al. |
| 5,528,315 A | 6/1996 | Sugiyama | | 5,668,639 A | 9/1997 | Martin |
| 5,530,235 A | 6/1996 | Stefik et al. | | 5,671,378 A | 9/1997 | Acker et al. |
| 5,532,740 A | 7/1996 | Wakui | | 5,671,440 A | 9/1997 | Curry |
| 5,534,975 A | 7/1996 | Stefik et al. | | 5,673,304 A | 9/1997 | Connor et al. |
| 5,537,151 A | 7/1996 | Orr | | 5,674,003 A | 10/1997 | Andersen |
| 5,537,530 A | 7/1996 | Edgar | | 5,675,358 A | 10/1997 | Bullock et al. |
| 5,539,528 A | 7/1996 | Tawa | | 5,675,752 A | 10/1997 | Scott et al. |
| 5,539,535 A | 7/1996 | Aizawa et al. | | 5,680,533 A | 10/1997 | Yamato |
| 5,539,658 A | 7/1996 | McCullough | | 5,680,534 A | 10/1997 | Yamato et al. |
| 5,541,656 A | 7/1996 | Kare et al. | | 5,682,197 A | 10/1997 | Moghadam et al. |
| 5,548,371 A | 8/1996 | Kawahara | | 5,682,207 A | 10/1997 | Takeda et al. |

| Patent | Kind | Date | Inventor |
|---|---|---|---|
| 5,682,326 | A | 10/1997 | Klingler et al. |
| 5,682,441 | A | 10/1997 | Ligtenberg et al. |
| 5,684,511 | A | 11/1997 | Westerink et al. |
| 5,684,542 | A | 11/1997 | Tsukagoshi |
| 5,687,408 | A | 11/1997 | Park |
| 5,699,109 | A | 12/1997 | Nishimura et al. |
| 5,703,644 | A | 12/1997 | Mori et al. |
| 5,706,049 | A | 1/1998 | Moghadam et al. |
| 5,706,097 | A | 1/1998 | Schelling et al. |
| 5,706,457 | A | 1/1998 | Dwyer et al. |
| 5,708,810 | A | 1/1998 | Kern et al. |
| 5,711,330 | A | 1/1998 | Nelson |
| 5,719,967 | A | 2/1998 | Sekine |
| 5,719,978 | A | 2/1998 | Kakii et al. |
| 5,719,987 | A | 2/1998 | Kawamura |
| 5,721,908 | A | 2/1998 | Lagarde |
| 5,721,909 | A | 2/1998 | Oulid-Aissa et al. |
| 5,724,070 | A | 3/1998 | Denninghoff et al. |
| 5,724,475 | A | 3/1998 | Kirsten |
| 5,724,579 | A | 3/1998 | Suzuki |
| 5,727,112 | A | 3/1998 | Kellar et al. |
| 5,727,159 | A | 3/1998 | Kikinis |
| 5,729,289 | A | 3/1998 | Etoh |
| 5,734,427 | A | 3/1998 | Hayashi |
| 5,734,436 | A | 3/1998 | Abe |
| 5,734,915 | A | 3/1998 | Roewer |
| 5,737,032 | A | 4/1998 | Stenzel |
| 5,737,476 | A | 4/1998 | Kim |
| 5,737,491 | A | 4/1998 | Allen et al. |
| 5,740,267 | A | 4/1998 | Echerer |
| 5,740,801 | A | 4/1998 | Branson |
| 5,742,339 | A | 4/1998 | Wakui |
| 5,742,475 | A | 4/1998 | Riddiford |
| 5,742,504 | A | 4/1998 | Meyer et al. |
| 5,742,659 | A | 4/1998 | Atac |
| 5,742,698 | A | 4/1998 | Minami et al. |
| 5,748,326 | A | 5/1998 | Thompson-Bell et al. |
| 5,748,831 | A | 5/1998 | Kubo |
| 5,751,350 | A | 5/1998 | Tanaka |
| 5,752,244 | A | 5/1998 | Rose |
| 5,754,873 | A | 5/1998 | Nolan |
| 5,757,418 | A | 5/1998 | Inagaki |
| 5,757,427 | A | 5/1998 | Miyaguchi |
| 5,757,468 | A | 5/1998 | Patton et al. |
| 5,758,180 | A | 5/1998 | Duffy et al. |
| 5,760,767 | A | 6/1998 | Shore et al. |
| 5,761,655 | A | 6/1998 | Hoffman |
| 5,761,686 | A | 6/1998 | Bloomberg |
| 5,764,276 | A | 6/1998 | Martin et al. |
| 5,764,291 | A | 6/1998 | Fullam |
| 5,767,897 | A | 6/1998 | Howell |
| 5,767,904 | A | 6/1998 | Miyake |
| 5,769,713 | A | 6/1998 | Katayama |
| 5,771,034 | A | 6/1998 | Gibson |
| 5,773,810 | A | 6/1998 | Hussey |
| 5,774,131 | A | 6/1998 | Kim |
| 5,781,175 | A | 7/1998 | Hara |
| 5,781,650 | A | 7/1998 | Lobo |
| 5,781,798 | A | 7/1998 | Beatty et al. |
| 5,784,177 | A | 7/1998 | Sanchez et al. |
| 5,784,525 | A | 7/1998 | Bell |
| 5,784,629 | A | 7/1998 | Anderson |
| 5,786,851 | A | 7/1998 | Kondo |
| D396,853 | S | 8/1998 | Cooper et al. |
| 5,790,094 | A | 8/1998 | Tanigawa et al. |
| 5,790,800 | A | 8/1998 | Gauvin et al. |
| 5,796,428 | A | 8/1998 | Matsumoto et al. |
| 5,796,875 | A | 8/1998 | Read |
| 5,797,051 | A | 8/1998 | Mcintyre |
| 5,801,685 | A | 9/1998 | Miller et al. |
| 5,801,770 | A | 9/1998 | Paff et al. |
| 5,801,773 | A | 9/1998 | Ikeda |
| 5,805,153 | A | 9/1998 | Nielsen |
| 5,805,163 | A | 9/1998 | Bagnas |
| 5,805,829 | A | 9/1998 | Cohen et al. |
| 5,806,005 | A | 9/1998 | Hull |
| 5,806,072 | A | 9/1998 | Kuba et al. |
| 5,815,160 | A | 9/1998 | Kikuchi |
| 5,815,201 | A | 9/1998 | Hashimoto |
| 5,818,977 | A | 10/1998 | Tansley |
| 5,819,103 | A | 10/1998 | Endoh et al. |
| 5,821,997 | A | 10/1998 | Kawamura |
| 5,822,492 | A | 10/1998 | Wakui et al. |
| 5,822,581 | A | 10/1998 | Christeson |
| 5,828,406 | A | 10/1998 | Parulski |
| 5,828,793 | A | 10/1998 | Mann |
| 5,831,590 | A | 11/1998 | Ikedo |
| 5,831,872 | A | 11/1998 | Pan |
| 5,835,761 | A | 11/1998 | Ishii et al. |
| 5,835,772 | A | 11/1998 | Thurlo |
| 5,838,325 | A | 11/1998 | Deen et al. |
| 5,841,422 | A | 11/1998 | Shyu |
| 5,841,471 | A | 11/1998 | Endsley et al. |
| 5,845,166 | A | 12/1998 | Fellegara |
| 5,847,706 | A | 12/1998 | Kingsley |
| 5,848,193 | A | 12/1998 | Garcia |
| 5,848,420 | A | 12/1998 | Xu |
| 5,850,483 | A | 12/1998 | Takabatake et al. |
| 5,852,502 | A | 12/1998 | Beckett |
| 5,861,918 | A | 1/1999 | Anderson |
| 5,862,218 | A | 1/1999 | Steinberg |
| 5,867,214 | A | 2/1999 | Anderson |
| 5,870,756 | A | 2/1999 | Nakata |
| 5,873,007 | A | 2/1999 | Ferrada suarez |
| 5,874,959 | A | 2/1999 | Rowe |
| 5,877,746 | A | 3/1999 | Parks et al. |
| 5,881,205 | A | 3/1999 | Andrew |
| 5,883,610 | A | 3/1999 | Jeon |
| 5,892,511 | A | 4/1999 | Gelsinger et al. |
| 5,892,847 | A | 4/1999 | Johnson |
| 5,896,131 | A | 4/1999 | Alexander |
| 5,896,203 | A | 4/1999 | Shibata |
| 5,898,434 | A | 4/1999 | Small et al. |
| 5,898,779 | A | 4/1999 | Squilla et al. |
| 5,898,833 | A | 4/1999 | Kidder |
| 5,900,909 | A | 5/1999 | Parulski et al. |
| 5,901,303 | A | 5/1999 | Chew |
| 5,903,309 | A | 5/1999 | Anderson |
| 5,903,786 | A | 5/1999 | Goto |
| 5,907,315 | A | 5/1999 | Vlahos et al. |
| 5,910,805 | A | 6/1999 | Hickey |
| 5,917,488 | A | 6/1999 | Anderson et al. |
| 5,920,726 | A | 7/1999 | Anderson |
| 5,926,208 | A | 7/1999 | Noonen et al. |
| 5,929,904 | A | 7/1999 | Uchida |
| 5,933,137 | A | 8/1999 | Anderson |
| 5,937,106 | A | 8/1999 | Murayama |
| 5,938,766 | A | 8/1999 | Anderson |
| 5,940,080 | A | 8/1999 | Ruehle |
| 5,940,121 | A | 8/1999 | Mcintyre |
| 5,943,050 | A | 8/1999 | Bullock et al. |
| 5,943,093 | A | 8/1999 | Anderson et al. |
| 5,949,408 | A | 9/1999 | Kang et al. |
| 5,949,432 | A | 9/1999 | Gough et al. |
| 5,949,474 | A | 9/1999 | Gerszberg et al. |
| 5,949,496 | A | 9/1999 | Kim |
| 5,949,950 | A | 9/1999 | Kubo |
| 5,956,084 | A | 9/1999 | Moronaga et al. |
| 5,963,670 | A | 10/1999 | Lipson et al. |
| 5,966,122 | A | 10/1999 | Itoh |
| 5,969,718 | A | 10/1999 | Mills |
| 5,969,761 | A | 10/1999 | Takahashi et al. |

| Patent No. | Date | Inventor |
|---|---|---|
| 5,973,691 A | 10/1999 | Servan-schreiber |
| 5,973,694 A | 10/1999 | Steele et al. |
| 5,973,734 A | 10/1999 | Anderson |
| 5,974,386 A | 10/1999 | Ejima et al. |
| 5,977,975 A | 11/1999 | Mugura et al. |
| 5,977,976 A | 11/1999 | Maeda |
| 5,977,985 A | 11/1999 | Ishii |
| 5,978,016 A | 11/1999 | Lourette et al. |
| 5,978,020 A | 11/1999 | Watanabe et al. |
| 5,978,607 A | 11/1999 | Teremy |
| 5,982,350 A | 11/1999 | Hekmatpour et al. |
| 5,982,429 A | 11/1999 | Kamamoto et al. |
| 5,983,297 A | 11/1999 | Noble et al. |
| 5,986,701 A | 11/1999 | Anderson |
| 5,987,223 A | 11/1999 | Narukawa et al. |
| 5,991,465 A | 11/1999 | Anderson |
| 5,991,515 A | 11/1999 | Fall et al. |
| 5,993,137 A | 11/1999 | Harr |
| 5,999,173 A | 12/1999 | Ubillos |
| 5,999,191 A | 12/1999 | Frank et al. |
| 5,999,207 A | 12/1999 | Rodriguez et al. |
| 5,999,740 A | 12/1999 | Rowley |
| 6,003,093 A | 12/1999 | Kester |
| 6,005,613 A | 12/1999 | Endsley et al. |
| 6,005,618 A | 12/1999 | Fukui |
| 6,006,039 A | 12/1999 | Steinberg et al. |
| 6,009,336 A | 12/1999 | Harris et al. |
| 6,011,585 A | 1/2000 | Anderson |
| 6,011,926 A | 1/2000 | Cockell |
| 6,012,088 A | 1/2000 | Li et al. |
| 6,015,093 A | 1/2000 | Barrett |
| 6,020,920 A | 2/2000 | Anderson |
| 6,020,982 A | 2/2000 | Yamauchi et al. |
| 6,022,315 A | 2/2000 | Iliff |
| 6,023,241 A | 2/2000 | Clapper |
| 6,023,697 A | 2/2000 | Bates et al. |
| 6,025,827 A | 2/2000 | Bullock et al. |
| 6,028,603 A | 2/2000 | Wang et al. |
| 6,028,611 A | 2/2000 | Anderson et al. |
| 6,031,964 A | 2/2000 | Anderson |
| 6,035,323 A | 3/2000 | Narayen et al. |
| 6,035,359 A | 3/2000 | Enoki |
| 6,037,972 A | 3/2000 | Horiuchi et al. |
| 6,038,545 A | 3/2000 | Mandeberg et al. |
| 6,052,555 A | 4/2000 | Ferguson |
| 6,052,692 A | 4/2000 | Anderson |
| 6,058,428 A | 5/2000 | Wang et al. |
| 6,072,479 A | 6/2000 | Ogawa |
| 6,072,480 A | 6/2000 | Gorbet et al. |
| 6,072,489 A | 6/2000 | Gough et al. |
| 6,075,905 A | 6/2000 | Herman et al. |
| 6,078,005 A | 6/2000 | Kurakake |
| 6,078,756 A | 6/2000 | Squilla et al. |
| 6,082,827 A | 7/2000 | Mcfall |
| 6,084,990 A | 7/2000 | Suzuki et al. |
| 6,091,846 A | 7/2000 | Lin et al. |
| 6,091,956 A | 7/2000 | Hollenberg |
| 6,094,221 A | 7/2000 | Andersion |
| 6,097,389 A | 8/2000 | Morris et al. |
| 6,097,430 A | 8/2000 | Komiya et al. |
| 6,097,431 A | 8/2000 | Anderson |
| 6,111,604 A | 8/2000 | Hashimoto |
| 6,118,480 A | 9/2000 | Anderson et al. |
| 6,122,003 A | 9/2000 | Anderson |
| 6,122,005 A | 9/2000 | Sasaki |
| 6,122,409 A | 9/2000 | Boggs et al. |
| 6,128,013 A | 10/2000 | Prabhu |
| 6,128,413 A | 10/2000 | Benamara |
| 6,137,468 A | 10/2000 | Martinez |
| 6,137,534 A | 10/2000 | Anderson |
| 6,141,044 A | 10/2000 | Anderson |
| 6,144,362 A | 11/2000 | Kawai |
| 6,147,703 A | 11/2000 | Miller |
| 6,147,709 A | 11/2000 | Martin et al. |
| 6,157,394 A | 12/2000 | Anderson |
| 6,161,131 A | 12/2000 | Garfinkle |
| 6,167,469 A | 12/2000 | Safai |
| 6,169,575 B1 | 1/2001 | Anderson |
| 6,169,725 B1 | 1/2001 | Gibbs et al. |
| 6,175,663 B1 | 1/2001 | Huang |
| 6,177,956 B1 | 1/2001 | Anderson et al. |
| 6,177,957 B1 | 1/2001 | Anderson |
| 6,188,431 B1 | 2/2001 | Oie |
| 6,188,432 B1 | 2/2001 | Ejima |
| 6,188,782 B1 | 2/2001 | Le beux |
| 6,204,877 B1 | 3/2001 | Kiyokawa |
| 6,205,485 B1 | 3/2001 | Kikinis |
| 6,209,048 B1 | 3/2001 | Wolff |
| 6,211,870 B1 | 4/2001 | Foster |
| 6,215,523 B1 | 4/2001 | Anderson |
| 6,222,538 B1 | 4/2001 | Anderson |
| 6,223,190 B1 | 4/2001 | Aihara et al. |
| 6,226,449 B1 | 5/2001 | Inoue et al. |
| 6,229,566 B1 | 5/2001 | Matsumoto et al. |
| 6,230,307 B1 | 5/2001 | Davis et al. |
| 6,233,015 B1 | 5/2001 | Miller |
| 6,237,010 B1 | 5/2001 | Hui |
| 6,239,794 B1 | 5/2001 | Yuen et al. |
| 6,239,837 B1 | 5/2001 | Yamada et al. |
| 6,246,430 B1 | 6/2001 | Peters |
| 6,249,316 B1 | 6/2001 | Anderson |
| 6,256,063 B1 | 7/2001 | Saito et al. |
| 6,262,769 B1 | 7/2001 | Anderson |
| 6,275,260 B1 | 8/2001 | Anderson |
| 6,278,447 B1 | 8/2001 | Anderson |
| 6,285,398 B1 | 9/2001 | Shinsky et al. |
| 6,292,218 B1 | 9/2001 | Parulski et al. |
| RE37,431 E | 10/2001 | Lanier et al. |
| 6,300,950 B1 | 10/2001 | Clark et al. |
| 6,304,851 B1 | 10/2001 | Kmack et al. |
| 6,307,544 B1 | 10/2001 | Harding |
| 6,310,647 B1 | 10/2001 | Parulski et al. |
| 6,310,648 B1 | 10/2001 | Miller et al. |
| 6,317,141 B1 | 11/2001 | Pavley |
| 6,334,025 B1 | 12/2001 | Yamagami |
| 6,353,848 B1 | 3/2002 | Morris |
| 6,356,281 B1 | 3/2002 | Isenman |
| 6,356,357 B1 | 3/2002 | Anderson |
| 6,380,972 B1 | 4/2002 | Suga et al. |
| 6,400,375 B1 | 6/2002 | Okudaira |
| 6,400,471 B1 | 6/2002 | Kuo et al. |
| 6,426,771 B1 | 7/2002 | Kosugi |
| 6,437,829 B1 | 8/2002 | Webb |
| 6,441,854 B2 | 8/2002 | Fellegara et al. |
| 6,441,927 B1 | 8/2002 | Dow et al. |
| 6,445,412 B1 | 9/2002 | Shiohara |
| 6,473,123 B1 | 10/2002 | Anderson |
| 6,483,602 B1 | 11/2002 | Haneda |
| 6,486,914 B1 | 11/2002 | Anderson |
| 6,493,028 B1 | 12/2002 | Anderson |
| 6,504,575 B1 | 1/2003 | Ramirez et al. |
| 6,507,362 B1 | 1/2003 | Akerib |
| 6,512,548 B1 | 1/2003 | Anderson |
| 6,515,704 B1 | 2/2003 | Sato |
| 6,532,039 B2 | 3/2003 | Anderson |
| 6,536,357 B1 | 3/2003 | Hiestand |
| 6,538,698 B1 | 3/2003 | Anderson |
| 6,563,535 B1 | 5/2003 | Anderson |
| 6,563,542 B1 | 5/2003 | Hatakenaka et al. |
| 6,567,122 B1 | 5/2003 | Anderson et al. |
| 6,571,271 B1 | 5/2003 | Savitzky et al. |
| 6,682,207 B2 | 1/2004 | Weber et al. |

| | | | |
|---|---|---|---|
| 6,683,649 B1 | 1/2004 | Anderson | |
| 6,738,075 B1 | 5/2004 | Torres | |
| 6,747,692 B2 | 6/2004 | Patel et al. | |
| 6,765,612 B1 | 7/2004 | Anderson et al. | |
| 6,779,153 B1 | 8/2004 | Kagle | |
| 6,803,945 B1 | 10/2004 | Needham | |
| 6,806,906 B1 | 10/2004 | Soga et al. | |
| 6,897,891 B2 | 5/2005 | Itsukaichi | |
| 6,965,400 B1 | 11/2005 | Haba et al. | |
| 7,050,143 B1 | 5/2006 | Silverbrook | |
| 7,215,371 B2 | 5/2007 | Fellegara et al. | |
| 7,337,403 B2 | 2/2008 | Pavley | |
| 2001/0010543 A1 | 8/2001 | Ward et al. | |
| 2001/0012062 A1 | 8/2001 | Anderson | |
| 2001/0014910 A1 | 8/2001 | Bobo | |
| 2001/0014968 A1 | 8/2001 | Mohammed | |
| 2001/0049758 A1 | 12/2001 | Shigetomi et al. | |
| 2001/0050711 A1 | 12/2001 | Karube et al. | |
| 2002/0105582 A1 | 8/2002 | Ikeda | |
| 2002/0109782 A1 | 8/2002 | Ejima | |
| 2003/0169350 A1 | 9/2003 | Wiezel | |
| 2006/0174326 A1 | 8/2006 | Ginter et al. | |
| 2006/0200260 A1 | 9/2006 | Hoffberg | |
| 2007/0061594 A1 | 3/2007 | Ginter et al. | |

FOREIGN PATENT DOCUMENTS

| | | | |
|---|---|---|---|
| EP | 0421769 A2 | 4/1991 |
| EP | 0422447 A2 | 4/1991 |
| EP | 0463856 A2 | 1/1992 |
| EP | 0519379 A2 | 6/1992 |
| EP | 0528084 A1 | 2/1993 |
| EP | 0555048 A2 | 8/1993 |
| EP | 0568468 A2 | 11/1993 |
| EP | 0617542 A2 | 9/1994 |
| EP | 0650125 A1 | 4/1995 |
| EP | 0661658 A2 | 7/1995 |
| EP | 0664475 A1 | 7/1995 |
| EP | 0664526 A2 | 7/1995 |
| EP | 0664527 A1 | 7/1995 |
| EP | 0729271 A2 | 8/1996 |
| EP | 0449106 B1 | 12/1996 |
| EP | 0817476 A2 | 1/1998 |
| EP | 0821522 A2 | 1/1998 |
| EP | 0835011 A1 | 4/1998 |
| EP | 0860735 A2 | 8/1998 |
| EP | 0860982 A2 | 8/1998 |
| EP | 0890919 A1 | 1/1999 |
| GB | 2245749 A | 1/1992 |
| GB | 2289555 A | 11/1995 |
| JP | 55-142470 A | 11/1980 |
| JP | 55-142471 A | 11/1980 |
| JP | 62-271178 A | 11/1987 |
| JP | 1-132173 A | 5/1989 |
| JP | 1-238382 A | 9/1989 |
| JP | 1-319870 A | 12/1989 |
| JP | 2-42489 A | 2/1990 |
| JP | 2-162420 A | 6/1990 |
| JP | 2-257262 A | 10/1990 |
| JP | 2-280484 A | 11/1990 |
| JP | 3-117181 A | 5/1991 |
| JP | 3-231574 A | 10/1991 |
| JP | 3-246766 A | 11/1991 |
| JP | 3-506111 A | 12/1991 |
| JP | 4-115788 A | 4/1992 |
| JP | 4-120889 A | 4/1992 |
| JP | 4-230517 A | 8/1992 |
| JP | 4-302886 A | 10/1992 |
| JP | 4-506144 A | 10/1992 |
| JP | 4-372070 A | 12/1992 |
| JP | 5-14847 A | 1/1993 |
| JP | 5-91452 A | 4/1993 |
| JP | 5-108785 A | 4/1993 |
| JP | 5-115027 A | 5/1993 |
| JP | 5-131779 A | 5/1993 |
| JP | 5-150308 A | 6/1993 |
| JP | 5-207343 A | 8/1993 |
| JP | 5-260351 A | 10/1993 |
| JP | 5-289838 A | 11/1993 |
| JP | 5-290143 A | 11/1993 |
| JP | 5-308617 A | 11/1993 |
| JP | 5-314093 A | 11/1993 |
| JP | 6-57612 A | 3/1994 |
| JP | 6-60078 A | 3/1994 |
| JP | 6-78260 A | 3/1994 |
| JP | 6-103352 A | 4/1994 |
| JP | 6-105266 A | 4/1994 |
| JP | 6-178261 A | 6/1994 |
| JP | 6-197299 A | 7/1994 |
| JP | 6-265794 A | 9/1994 |
| JP | 6-290103 A | 10/1994 |
| JP | 6-348467 A | 12/1994 |
| JP | 6-350949 A | 12/1994 |
| JP | 7-6028 A | 1/1995 |
| JP | 7-160842 A | 6/1995 |
| JP | 7-168852 A | 7/1995 |
| JP | 7-184160 A | 7/1995 |
| JP | 7-221911 A | 8/1995 |
| JP | 7-245723 A | 9/1995 |
| JP | 7-274060 A | 10/1995 |
| JP | 7-274108 A | 10/1995 |
| JP | 7-295873 A | 11/1995 |
| JP | 8-32847 A | 2/1996 |
| JP | 8-502840 A | 3/1996 |
| JP | 8-111845 A | 4/1996 |
| JP | 8-114849 A | 5/1996 |
| JP | 8-116476 A | 5/1996 |
| JP | 8-140025 A | 5/1996 |
| JP | 8-147952 A | 6/1996 |
| JP | 8-205014 A | 8/1996 |
| JP | 8-223524 A | 8/1996 |
| JP | 8-249450 A | 9/1996 |
| JP | 8-279034 A | 10/1996 |
| JP | 8-331495 A | 12/1996 |
| JP | 8-339297 A | 12/1996 |
| JP | 9-27939 A | 1/1997 |
| JP | 9-37139 A | 2/1997 |
| JP | 9-163275 A | 6/1997 |
| JP | 9-171213 A | 6/1997 |
| JP | 9-311850 A | 12/1997 |
| JP | 10-4535 A | 1/1998 |
| JP | 10-162020 A | 6/1998 |
| JP | 10-243331 A | 9/1998 |
| JP | 2000-92439 A | 3/2000 |
| JP | 2000-510616 A | 8/2000 |
| JP | 2000-287110 A | 10/2000 |
| JP | 2001-501416 A | 1/2001 |
| WO | WO 91/14334 A1 | 9/1991 |
| WO | WO 92/05652 A2 | 4/1992 |
| WO | WO 92/05655 A1 | 4/1992 |
| WO | WO 92/09169 A1 | 5/1992 |
| WO | WO 92/20186 A1 | 11/1992 |
| WO | WO 94/23375 A1 | 10/1994 |
| WO | WO 95/32583 A1 | 11/1995 |
| WO | WO 96/02106 A1 | 1/1996 |
| WO | WO 96/29818 A1 | 9/1996 |
| WO | WO 97/17669 A1 | 5/1997 |
| WO | WO 97/38510 A1 | 10/1997 |
| WO | WO 98/14887 A1 | 4/1998 |

OTHER PUBLICATIONS

*Sony Digital Still Camera DSC–F1 Operating Instructions*, pp. 1–6, 16–17, 22–25, and 57–58, published 1996.

"Laboratory Analysis—Data Link: The Future of Camera Technology," *Popular Photography*, Sep. 1993, p. 48.

"PCMCIA for PowerBook 500 Series Computers," *Apple–Facts Online*, 1994, <http://product.info.apple.com/product-info/factsheets/pcmcia.html>.

"YCC Color Space," Oct. 3, 2000, <http://www.aols.com/colorite/yccspace.html>.

"MM4850: Image: Representation," Nov. 4, 1996, <http://www.mcs.csueastbay.edu/~febo/Classes/4850/Image/representation.html>.

"What Isn't Obvious in the Patent World," PATNEWS, Jan. 30, 1998, email correspondence.

*Laura Lemay's Guide to Sizzling Web Site Design*, Sans.net Publishing, Indianapolis, 1997, pp. 75–77.

"Digitella Technology Solutions Announces ScriptGenerator 1.0, Enabling Users to Easily Develop Software Scripts that Run on Digital Cameras," *PR Newswire*, Oct. 7, 1998.

Grimm, Leigh, "The Manipulation Proclamation," *Photo Trade News*, Feb. 1997, p. 66.

"Kodak DC3400 Zoom—Distinctive New Kodak DC3400 Zoom Digital Camera Offers Easy–to–Use Features, Stylish New Look, All at Affordable Price," *Kodak Press Release*, Aug. 1, 2000.

Hauf et al., "The FlashPix™ Image File Format," *The Fourth Color Imaging Conference: Color Science, Systems and Applications*, 1996, pp. 234–238.

Watanabe et al., "An Image Data File Format for Digital Still Camera," *IS&T's 48th Annual Conference Proceedings*, May 1995, vol. 48, pp. 421–424.

"Disk Drive with Embedded Hyper–Text Markup Language Server," *IBM Technical Disclosure Bulletin*, vol. 38, No. 12, Dec. 1995, p. 479.

"Phaser® 740L Color–Capable Laser Printer," printed Apr. 15, 1999, <http://www.tek.com/Color_Printers/products/740L/740Lfe.htm>.

"What is PhaserLink Software?," printed Apr. 15, 1999, <http://www.tek.com/Color_Printers/userdoc/PShare3/phlink1.htm>.

Corcoran et al., "A Portable Java API Interface to Simplify User Access to Digital Cameras," *IEEE Transactions on Consumer Electronics*, vol. 44, No. 3, Aug. 1998, pp. 686–691.

Mann, Steve, "Headmounted Wireless Video: Computer–Supported Collaboration for Photojournalism and Everyday Use," *IEEE Communications Magazine*, vol. 36, No. 6, Jun. 1998, pp. 144–151.

Williams, Martyn, "Review—NEC PC–DC401 Digital Still Camera," *AppleLink Newbytes*, Mar. 15, 1996.

Peisel, Bill, "Designing the Next Step in Internet Appliances," *Electronic Design*, Mar. 23, 1998, pp. 50, 52, and 56.

Steinfield, Edward, "Leveraging Browsers as Universal GUIs," *EE Times*, Issue 932, Dec. 16, 1996, 4 pages.

Newby, Kris, "Apple's New Image–Capture Platform," *Apple Directions*, Aug. 1996.

"Device Drivers via the Access Bus," *IBM Technical Disclosure Bulletin*, vol. 39, No. 1, Jan. 1996, pp. 135–136.

Degann et al., "Still Images Retrieval from a Remote Database: The System *Imagine*," *Signal Processing: Image Communication*, vol. 5, No. 3, May 1993, pp. 219–234.

"Getting Started With Your Macintosh LC III," cover and inside cover page, p. 21, 1992.

"User's Guide Microsoft Windows & MS–DOS 6," Microsoft Corporation, pp. iii and 71–75, 1993.

Ide, K., "Color Zaurus," Soft Bank KK, Japan, Aug. 15, 1996, pp. 1–111.

Kodak Professional Digital Camera System (DSC100) User's Manual, Eastman Kodak Company, 1991–1992.

Nikon Digital Camera E100 brochure, Nikon Corporation, Electronic Imaging Division, Sep. 1996.

Canon PowerShot 600 Digital Camera brochure, Canon Computer Systems, Inc., 1996.

Canon PowerShot 350 Digital Camera brochure, Canon Computer Systems, Inc., 1997.

Fujix Digital Card Camera DS–220 brochure, Fuji Photo Film Co., Ltd., 1995.

Epson PhotoPC 500 Color Digital Camera brochure Seiko Epson Corporation, Oct. 3, 1995.

Okachi et al., "Clear! Simple! Upgraded Digital Photography," *Nikkei Personal Computing*, Nikkei Business Publications, Inc., Japan, Aug. 26, 1996, vol. 271, pp. 236–264.

Kurzidim, "Bildersafari: Foto–Und Videodatenbanken von 100 bis 100000 OM", vol. 9, 1994, pp. 112–114, 116–117, 120–121.

Aker et al., *The Macintosh Bible*, Third Edition, Nov. 1991, pp. 63–64, 324, 931, 945, Goldstein & Blair, Berkeley, California.

*Liquid Crystal Digital Camera QV–10B Owner's Manual*, Casio, 1995, pp. 1–89, Casio Computer Co., Ltd.

Foley et al., *Introduction to Computer Graphics*, 1994, 1990, pp. 505–509, Addison–Wesley Publishing Company, Inc.

Foley et al., *Computer Graphics—Principles and Practice, Second Edition*, Jun. 15, 1990, pp. 754–759, Addison–Wesley Publication Company, Inc.

*Inside Macintosh*, Apple Computer, 1993, pp. 1–5 to 1–8 and 4–1 to 4–46, Apple Computer Inc., Cupertino, California.

Kroiak et al., "A Declaration of Device Independence," *ESD: The Electronic System Design Magazine*, May 1988, pp. 63–65, vol. 18, No. 5.

Melville et al., "An Application Programmer's Interface for Digital Cameras," Imaging Science and Technology's 49th Annual Conference, May 19–24, 1996, The Society for Imaging Science and Technology.

*Picona PC–DC200 PC–DC200K User's Manual*, Feb. 1997, NEC Corporation.

Posnak et al., "An Adaptive Framework for Developing Multimedia Software Components," *Communications of the ACM*, Oct. 1997, pp. 43–47, vol. 40, No. 10, ACM.

*Ricoh Digital Camera RDC–1 Instruction Manual*, Ricoh, Ricoh Americas Corp., Ricoh Co., Ltd Japan.

Shimizu et al., "The Digital Camera Using New Compression and Interpolation Algorithm," IS&T 49th Annual Conference, May 19–24, 1996, pp. 268–272, IS&T, Springfield, Virginia.

Skelton et al., "Design and Development of a Transportable Image Processing and GIS System," *Infrared Image Processing and Enhancement*, May 20–21, 1987, pp. 187–191, vol. 781, SPIE, Bellingham, Washington.

Texas Instruments TI–85 Guidebook, 1993, Texas Instruments Incorporated.

Texas Instruments TI–92 Guidebook, 1995, Texas Instruments Incorporated.

VxWorks Programmer's Guide, 1984–1999, Wind River Systems, Inc.

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-7 is confirmed.

New claims 8-32 are added and determined to be patentable.

8. *The method of claim 1 wherein the luminance value of each pixel of the image data that does not fall within the area of the overlay bar is not modified.*

9. *The method of claim 1 further comprising storing each pixel of the image data that falls within the area of the overlay bar as stored data in a first buffer, wherein at least some of the plurality of pixels of the image data are not stored in the first buffer.*

10. *The method of claim 9 wherein in response to an input to turn off the overlay bar, further comprising the steps of:*
    *retrieving the stored data from the first buffer; and*
    *displaying each pixel of the image data that falls within the area of the overlay bar with the stored data that was retrieved from the first buffer, wherein the image data for an entirety of the image is not re-processed for display when the overlay bar is turned off.*

11. *The method of claim 1 wherein the text information of the overlay bar corresponds to mode-specific information based on an operational state of the digital imaging device.*

12. *The method of claim 11 wherein the mode-specific information is status information.*

13. *The method of claim 11 wherein the mode-specific information is an interactive instruction to guide a user through operation of the digital imaging device.*

14. *The method of claim 1 wherein the text information of the overlay bar corresponds to a mode-specific function label, which is assigned to a function key of the digital imaging device.*

15. *The method of claim 14 wherein the overlay bar extends along one side of the display screen; the function key is substantially adjacent the one side of the display screen; and the function key provides a soft key that has a different function in different operating modes.*

16. *The method of claim 1 wherein the overlay bar extends along one side of the display screen; the text information of the overlay bar corresponds to a plurality of mode-specific function labels, which are assigned to corresponding function keys of the digital imaging device; the function keys are substantially adjacent the one side of the display screen; and the function keys provide soft keys that have different functions in different operating modes.*

17. *The method of claim 1 wherein each pixel of image data that falls under a pixel of text in the overlay bar is overwritten with corresponding text information.*

18. *The method of claim 1 wherein the overlay bar is a substantially elongated rectangle that resides substantially along a bottom side of the display screen.*

19. *The method of claim 1 wherein the overlay bar is a substantially elongated rectangle that resides substantially along a top side of the display screen.*

20. *The method of claim 1 wherein the predetermined area of the display screen for displaying the overlay bar is less than about 20 percent of an overall area of the display screen.*

21. *The method of claim 1 wherein the area of the display screen which does not display the overlay bar is more than about 80 percent of the overall area of the display screen.*

22. *The method of claim 1 wherein the image is a digital image captured by the digital imaging device.*

23. *The method of claim 1 wherein as the image data is being processed for display, further comprising the steps of:*
    *storing in a first buffer the image data that falls within the area of the overlay bar; and*
    *storing in a second buffer text data that corresponds to each pixel of the text of the overlay bar, wherein the overwriting step further comprises merging the image data that falls within the area of the overlay bar from the first buffer with the text data from the second buffer to generate overlay bar data, and storing the overlay bar data in a display buffer along with the image data that falls outside of the area of the overlay bar.*

24. *The method of claim 1 wherein the text information displayed on the overlay bar is not translucent.*

25. *The method of claim 1 wherein the text information displayed on the overlay bar is not translucent and a background of the overlay bar is translucent.*

26. *The method of claim 1 wherein the overlay bar comprises graphic information.*

27. *The method of claim 1 wherein the luminance value of each pixel of the image data that falls within the area of the overlay bar is modified by increasing the luminance value.*

28. *The method of claim 1 wherein the luminance value of each pixel of the image data that falls within the area of the overlay bar is modified by decreasing the luminance value.*

29. *The method of claim 28 wherein the luminance value is decreased such that colors of the image data within the overlay bar appear approximately half as bright.*

30. *The method of claim 1 wherein:*
    *when the overlay bar is turned on, the overlay bar with the text information appears over the image, which was captured by the digital imaging device; an*
    *when the overlay bar is turned off, the image is displayed in a manner that is unobstructed by the overlay bar with the text information.*

31. *The method of claim 1 further comprising:*
    *receiving input from the user to enter a capture mode;*
    *capturing the image; and*
    *receiving input from the user to enter a play mode during which the image is displayed.*

32. *The method of claim 1, wherein the digital imaging device comprises a first buffer, a second buffer, and a display buffer, and wherein the method further comprises:*
    *storing text in the second buffer;*
    *storing a first image in the display buffer;*
    *storing a backstore portion of the first image in the first buffer, wherein the backstore portion corresponds to an area of the first image where the overlay bar will be located;* generating an overlay bar by merging data from the first buffer with data from the second buffer, wherein:
  a) the overlay bar has text pixels from the second buffer in locations where text pixels occur in the second buffer;
  b) the overlay bar has image pixels from the first buffer in locations where text pixels do not occur in the second buffer; and
  c) the luminance values of image pixels from the first buffer are altered to provide a translucent appearance for the overlay bar;

overwriting the backstore portion of the first image in the display buffer with the overlay bar to provide a second image having the overlay bar in the display buffer; and upon receiving a command to turn off the overlay bar:
  a) retrieving the backstore portion of the first image from the first buffer; and
  b) using the backstore portion of the first image to overwrite the overlay bar in the display buffer such that the first image is recreated in the display buffer.

\* \* \* \* \*